US012118773B2

(12) United States Patent
Acharya et al.

(10) Patent No.: US 12,118,773 B2
(45) Date of Patent: Oct. 15, 2024

(54) MACHINE LEARNING SYSTEM FOR TECHNICAL KNOWLEDGE CAPTURE

(71) Applicant: SRI International, Menlo Park, CA (US)

(72) Inventors: Girish Acharya, Redwood City, CA (US); Louise Yarnall, San Mateo, CA (US); Anirban Roy, San Francisco, CA (US); Michael Wessel, Palo Alto, CA (US); Yi Yao, Princeton, NJ (US); John J. Byrnes, Poway, CA (US); Dayne Freitag, La Mesa, CA (US); Zachary Weiler, San Francisco, CA (US); Paul Kalmar, La Mesa, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 695 days.

(21) Appl. No.: 17/129,541

(22) Filed: Dec. 21, 2020

(65) Prior Publication Data
US 2021/0192972 A1 Jun. 24, 2021

Related U.S. Application Data

(60) Provisional application No. 62/952,658, filed on Dec. 23, 2019.

(51) Int. Cl.
G06V 10/82 (2022.01)
G06F 18/22 (2023.01)
(Continued)

(52) U.S. Cl.
CPC ............. *G06V 10/82* (2022.01); *G06F 18/22* (2023.01); *G06N 20/00* (2019.01); *G06V 20/20* (2022.01);
(Continued)

(58) Field of Classification Search
CPC ................. G06V 10/82; G06V 30/274; G06V 30/19173; G06N 20/00; G06N 20/20;
(Continued)

(56) References Cited

U.S. PATENT DOCUMENTS 5,846,086 A 12/1998 Emilio
8,059,863 B2 11/2011 Shibuya et al.
(Continued)

FOREIGN PATENT DOCUMENTS

JP 2000504854 A 4/2000
JP 2007323222 A 12/2007
(Continued)

OTHER PUBLICATIONS

Deng, J., et al., Fine-Grained Crowdsourcing for Fine-Grained Recognition, IEEE Conference on Computer Vision and Pattern Recognition (CVPR), Jun. 2013, 8 pgs.
(Continued)

Primary Examiner — Timothy A Musselman
(74) Attorney, Agent, or Firm — Shumaker & Sieffert, P.A.

(57) ABSTRACT

This disclosure describes machine learning techniques for capturing human knowledge for performing a task. In one example, a video device obtains video data of a first user performing the task and one or more sensors generate sensor data during performance of the task. An audio device obtains audio data describing performance of the task. A computation engine applies a machine learning system to correlate the video data to the audio data and sensor data to identify portions of the video, sensor, and audio data that depict a same step of a plurality of steps for performing the task. The machine learning system further processes the correlated data to update a domain model defining performance of the task. A training unit applies the domain model to generate
(Continued)

training information for performing the task. An output device outputs the training information for use in training a second user to perform the task.

20 Claims, 9 Drawing Sheets

(51) Int. Cl.
| | |
|---|---|
| G06N 20/00 | (2019.01) |
| G06V 20/20 | (2022.01) |
| G06V 20/40 | (2022.01) |
| G06V 30/19 | (2022.01) |
| G06V 30/262 | (2022.01) |
| G06V 40/10 | (2022.01) |
| G06V 40/20 | (2022.01) |
| G09B 5/06 | (2006.01) |
| G09B 19/00 | (2006.01) |
| G10L 15/18 | (2013.01) |
| G10L 25/57 | (2013.01) |

(52) U.S. Cl.
CPC ........ *G06V 20/41* (2022.01); *G06V 30/19173* (2022.01); *G06V 30/274* (2022.01); *G06V 40/10* (2022.01); *G06V 40/113* (2022.01); *G06V 40/28* (2022.01); *G09B 5/065* (2013.01); *G09B 19/003* (2013.01); *G10L 15/1815* (2013.01); *G10L 25/57* (2013.01)

(58) Field of Classification Search
CPC ........ G06N 20/41; G06N 40/10; G06N 40/28; G06N 40/113; G06F 18/22; G09B 5/065; G09B 19/003; G10L 15/1815; G10L 25/57

See application file for complete search history.

(56) References Cited

U.S. PATENT DOCUMENTS

| | | | |
|---|---|---|---|
| 8,694,355 | B2 | 4/2014 | Bui et al. |
| 8,920,172 | B1 | 12/2014 | Wilmink et al. |
| 9,046,917 | B2 | 6/2015 | Senanayake et al. |
| 9,501,745 | B2 | 11/2016 | Nitz et al. |
| 10,769,491 | B2 | 8/2020 | Matei et al. |
| 10,769,536 | B2 | 9/2020 | Matsumura |
| 11,657,727 | B2 * | 5/2023 | Truong ................. G06V 40/174 434/219 |
| 2013/0035796 | A1 | 2/2013 | Neilson et al. |
| 2013/0035976 | A1 | 2/2013 | Buffett |
| 2013/0232494 | A1 | 9/2013 | Dolph et al. |
| 2013/0330705 | A1 | 12/2013 | Grimaud et al. |
| 2014/0058789 | A1 | 2/2014 | Doehring et al. |
| 2014/0272909 | A1 * | 9/2014 | Isensee ................. G09B 7/02 434/362 |
| 2014/0335480 | A1 * | 11/2014 | Asenjo ................. G06Q 10/06 434/107 |
| 2016/0193500 | A1 * | 7/2016 | Webster ............. G09B 19/0038 434/247 |
| 2017/0032285 | A1 | 2/2017 | Sharma et al. |
| 2017/0256068 | A1 | 9/2017 | Wang et al. |
| 2018/0137406 | A1 | 5/2018 | Howard et al. |
| 2018/0250826 | A1 | 9/2018 | Jiang et al. |
| 2019/0114041 | A1 | 4/2019 | Pitkanen |
| 2019/0205758 | A1 | 7/2019 | Zhu et al. |
| 2019/0266514 | A1 * | 8/2019 | Akella ............... G05B 23/0254 |
| 2019/0317803 | A1 | 10/2019 | Maheshwari et al. |
| 2019/0355281 | A1 | 11/2019 | Abe |
| 2019/0362243 | A1 | 11/2019 | Matsumura |
| 2020/0020097 | A1 | 1/2020 | Do et al. |
| 2020/0219033 | A1 | 7/2020 | Smutko et al. |
| 2020/0233865 | A1 | 7/2020 | Myers et al. |
| 2021/0097082 | A1 | 4/2021 | Billa et al. |

FOREIGN PATENT DOCUMENTS

| | | |
|---|---|---|
| JP | 2012234406 A | 11/2012 |
| JP | 2013257565 A | 12/2013 |
| JP | 2019109844 A | 7/2019 |
| JP | 2019200257 A | 11/2019 |
| WO | WO 2019018063 A1 | 1/2019 |
| WO | 2019125084 A1 | 6/2019 |

OTHER PUBLICATIONS

Donahue, J. et al., "DeCAF: A Deep Convolutional Activation Feature for Generic Visual Recognition," International Conference in Machine Learning (ICML), Jun. 2014, 9 pgs.

Dai et al., "Efficient Fine-grained Classification and Part Localization Using One Compact Network," 2017 IEEE International Conference on Computer Vision Workshops, Oct. 22-29, 2017, 9 pp.

Fukui, A. et al., "Multimodal Compact Bilinear Pooling for Visual Question Answering and Visual Grounding," CoRR, Sep. 2016, 12 pgs.

Gao, Y. et al., "Compact Bililnear Pooling," IEEE Conference on Computer Vision and Pattern Recognition (CVPR), Apr. 2016, 10 pgs.

Huang, S. et al., "Part-Stacked CNN for Fine-Grained Visual Categorization," IEEE Conference on Computer Vision and Pattern Recognition (CVPR), Jun. 2016, 10 pgs.

Iandola, F. et al., "SqueezeNet: AlexNet-level accuracy with 50x fewer parameters and <0.5MB model size," CoRR, Nov. 2016, 13 pgs.

Iandola, F. et al., "SqueezeNet: AlexNet-level accuracy with 50x fewer parameters and <1MB model size," CoRR, Feb. 2016, 5 pgs.

ImageNet, "About Overview," retrieved from http://image-net.org/about-overview, 2016, 1 pg. (Applicant points out, in accordance with MPEP 609.04(a), that the year of publication, 2016, is sufficiently earlier than the effective U.S. filing date, so that the particular month of publication is not an issue.).

ImageNet, "Index," retrieved from http://image-net.org/index, 2016, 1 pg. (Applicant points out, in accordance with MPEP 609.04(a), that the year of publication, 2016, is sufficiently earlier than the effective U.S. filing date, so that the particular month of publication is not an issue.).

Jia, Y. et al., "Caffe: Convolutional Architecture for Fast Feature Embedding," arXiv preprint, Jun. 2014, 4pgs.

Krause, J. et al., "3D Object Representations for Fine-Grained Categorization," 4th International IEEE Workshop on 3D Representation and Recognition (3dRR-13), Sydney, Australia, Dec. 2013, 8 pgs.

Krause, J. et al., "Fine-Grained Recognition without Part Annotations," IEEE Conference on Computer Vision and Pattern Recognition (CVPR), Jun. 2015, 10 pgs.

Krause, J. et al., "Learning Features and Parts for Fine-Grained Recognition," International Conference on Pattern Recognition, Stockholm, Sweden, Aug. 2014, 8 pgs.

Krause, J. et al., "The Unreasonable Effectiveness of Noisy Data for Fine-Grained Recognition," CoRR, Oct. 2016, 26 pgs.

Lin, D. et al., "Deep LAC: Deep Localization, Alignment and Classification for Fine-grained Recognition," 2015 IEEE Conference on Computer Vision and Pattern Recognition (CVPR), Jun. 2015, pp. 1666-1674.

Lin, T. et al., "Bilinear CNN Models for Fine-grained Visual Recognition," International Conference on Computer Vision (ICCV), Dec. 2015, 9 pgs.

Liu, X. et al., "Representation Learning Using Multi-Task Deep Neural Networks for Semantic Classification and Information Retrieval," Proceedings of the 2015 Conference of the North American Chapter of the Association for Computational Linguistics: Human Language Technologies, May 2015, 10 pgs.

Response to Office Action, and translation thereof, dated Mar. 1, 2022, from counterpart Japanese Application No. 2020-213123 filed Aug. 31, 2022, 34 pp.

Decision of Rejection, and translation thereof, from counterpart Japanese Application No. 2020-213123 dated Oct. 11, 2022, 9 pp.

(56) References Cited

OTHER PUBLICATIONS

First Office Action and Search Report, and translation thereof, from counterpart Japan Application No. 2020-213123 dated Mar. 1, 2022, 7 pp.
Hariharan et al., "Remote student localization using audio and video processing for synchronous interactive e- earning", 2012 Third International Conference on Computing, Communication and Networking Technologies, IEEE, USA, Jul. 26, 2012, 8 pp.
Seki et al., "A teacher training system based on remote education model on the Internet", IEICE Technical Report Publication, vol. 1.99, No. 30, The Institute of Electronics, Information and Communication Engineers, Japan, Apr. 23, 1999, 10 pp. Translation provided for only the Abstract (on p. 49) per MPEP 609.04(b).
Demaitre, "Denso, Drishti join forces to apply computer vision to productivity," WTWH Media, LLC., Retrieved Jun. 11, 2021 from: https://www.therobotreport.com/drishti-denso-join-apply-computer-vision-human-productivity/, Feb. 18, 2020, 5 pp.
"HI5 VR Glove Business Edition," Noitom Ltd., Retrieved Apr. 19, 2021, from: thttps://web.archive.org/web/20190212014355/https://hi5vrglove.com/store/hi5glove, Feb. 12, 2019, 3 pp.
"Mbientlab Inc," MetaMotion, Retrieved May 17, 2021, from: https://web.archive.org/web/20180525052543/https://mbientlab.com/, May 25, 2018, 5 pp.
"Nansense Gloves," Nansense Inc., Retrieved May 17, 2021, from: https://web.archive.org/web/20190904154649/https://www.nansense.com/gloves/, Sep. 4, 2019, 5 pp.
"Fingertps Pressure Sensor System," PPS, Retrieved: https://web.archive.org/web/20190318104006/https://pressureprofile.com/fingertps, Mar. 18, 2019, 3 pp.
"FingerTPS™," PPS, Configurable Hand & Finger Force Measurement System Brochure, Aug. 21, 2019, 5 pp.
"SingleTact," Pressure Profile Systems, Retrieved Jun. 11, 2021 from: https://web.archive.org/web/20190106155822/https://www.singletact.com/, Jan. 6, 2019, 5 pp.
"SingleTact," Pressure Profile Systems, Retrieved Jun. 11, 2021 from: https://web.archive.org/web/20190226151350/http://www.singletact.com/micro-force-sensor, Feb. 26, 2019, 3 pp.
"SingleTact Spec Sheet," https://www.singletact.com/, Retrieved: https://cdn2.hubspot.net/hubfs/5361756/Spec%20Sheets/SingleTact%20Spec%20Sheet,%202017-08-28.pdf, Aug. 28, 2017, 5 pp.
"TactileGlove—Glove Sensor," PPS, Retrieved from: http://web.archive.org/web/20190318104040if_/https://pressureprofile.com/tactile-glove, Mar. 18, 2019, 3 pp.
"TactileGlove Spec Sheet," PPS, Retrieved from: https://pressureprofile.com/body-pressure-mapping/tactile-glove, Jun. 17, 2020, 5 pp.
"Digtacts—Pressure Mapping Solutions," PPS, Retrieved May 17, 2021 from: http://web.archive.org/web/20190318103747/https://pressureprofile.com/digitacts-sensors, Mar. 18, 2019, 2 pp.
"Prime One—The All-round VR Gloves by Manus VR," Gadgenda, Retrieved Jun. 11, 2021 from: https://www.gadgenda.com/prime-one-the-all-round-vr-gloves-by-manus-vr, Oct. 3, 2019, 2 pp.
Graham, "Going (Literally) Hands-On With Manus Prime Haptic Gloves," Retrieved Jun. 11, 2021 from: https://www.vrfocus.com/2019/09/going-literally-hands-on-with-manus-prime-haptic-gloves/, Sep. 16, 2019, 5 pp.
"World's leading VR Gloves for training," Manus VR, Retrieved Jun. 11, 2021 from: https://web.archive.org/web/20190712231536/https:/manus-vr.com/, Jul. 12, 2019, 2 pp.
"Prime One: the new era of hand tracking," Manus VR, Retrieved Jun. 11, 2021 from: https://web.archive.org/web/20200512104847/https:/manus-vr.com/prime-one-gloves/, May 12, 2020, 2 pp.
"Prime Series Infokit 2019," Manus, Nov. 18, 2019, 8 pp.
"CyberGlove III," CyberGlove Systems, Retrieved May 17, 2021 from: https://web.archive.org/web/20191129120551/http://www.cyberglovesystems.com/cyberglove-iii, Jan. 29, 2019, 5 pp.
"CyberGlove Data Sheet," CyberGlove Systems, Sep. 21, 2015, 2 pp.
"Adept Client Application Guide," 2012, retrieved from www.ai.sri.com/pal/PAL-software-downloads/PAL-zipfiles-and-docs/itl-doc/ClientApplicationGuide.html on Feb. 26, 2020, 18 pp.
"Adept User Guide," 2012, retrieved from www.ai.sri.com/pal/PAL-software-downloads/PAL-zipfiles-and-docs/itl-doc/UserGuide.html on Feb. 26, 2020, 17 pp.
Berg, T. et al., "POOF: Part-Based One-vs-One Features for Fine-Grained Categorization, Face Verification, and Attribute Estimation," Proc. Conf. Computer Vision and Pattern Recognition (CVPR), Jun. 2013, 8 pgs.
Branson, S. et al., "Bird Species Categorization Using Pose Normalized Deep Convolutional Nets," British Machine Vision Conference (BMVC) Nottingham, Jun. 2014, 14 pgs.
Cafee, "Deep learning framework by Bair," retrieved from http://caffe.berkeleyvision.org/, May 2, 2019, 1.
Pfister, T., "Advancing Human Pose and Gesture Recognition," PhD Thesis, University of Oxford, Apr. 2015, 220 pgs.
Pfister, T., "Deep Convolutional Neural Networks for Efficient Pose Estimation in Gesture Videos," Asian Conference on Computer Vision; 2014, 16 pgs. (Applicant points out, in accordance with MPEP 609.04(a), that the year of publication, 2014, is sufficiently earlier than the effective U.S. filing date, so that the particular month of publication is not an issue.).
Ranjan, R. et al., "HyperFace: A Deep Multi-task Learning Framework for Face Detection, Landmark Localization, Pose Estimation, and Gender Recognition," CoRR, Dec. 2017, 16 pgs.
Razavian, A. et al., "CNN Features off-the-shelf: an Astounding Baseline for Recognition," Proceedings of the 2014 IEEE Conference on Computer Vision and Pattern Recognition Workshops, CVPRW '14, Washington, DC, USA, May 2014, IEEE Computer Society, 8 pgs.
Shih, K. et al., "Part Localization using Multi-Proposal Consensus for Fine-Grained Categorization," British Machine Vision Conference (BMVC), Jul. 2015, 12 pgs.
Simonyan, K. et al., "Very Deep Convolutional Networks for Large-Scale Image Recognition," CoRR, Apr. 2015, 14 pgs.
Toshev, A. et al., "DeepPose: Human Pose Estimation via Deep Neural Networks," 2014 IEEE Conference on Computer Vision and Pattern Recognition, CVPR 2014, Columbus, OH USA, Aug. 2014, 9 pgs.
Tuzel, O. et al., "Region Covariance: A Fast Descriptor for Detection and Classification,", Springer Berlin Heidelberg, Berlin, Heidelberg; May 2006, (Paper ID 367), 13 pgs.
Visual Geometry Group (VGG)-16 network, a 16 layer convolutional neural network, retrieved from https://gist.github.com/ksimonyan/211839e770f7b538e2d8#file-readme-md, 2014, 11 pgs. (Applicant points out, in accordance with MPEP 609.04(a), that the year of publication, 2014, is sufficiently earlier than the effective U.S. filing date, so that the particular month of publication is not an issue.).
Wah, C. et al., "The Caltech-USCD Birds-200-2011 Dataset," Technical Report, Nov. 2011, 8 pgs.
Wang, J. et al., "Locality-constrained Linear Coding for Image Classification," IEEE Conference on Computer Vision and Pattern Recognition (CVPR), Jun. 2010, 8 pgs.
Wang, Y. et al.;"Mining Discriminative Triplets of Patches for Fine-Grained Classification," IEEE Conference on Computer Vision and Pattern Recognition (CVPR), May 2016, 10 pgs.
Xie, S. et al., "Hyper-class Augmented and Regularized Deep Learning for Fine-grained Image Classification," 2015 IEEE Conference on Computer Vision and Pattern Recognition (CVPR), Jun. 2015, 10 pgs.
Zhang, N. et al., "Deformable Part Descriptors for Fine-grained Recognition and Attribute Prediction," IEEE International Conference on Computer Vision (ICCV), Dec. 2013, 8 pgs.
Zhang, N. et al., "Part-based R-CNNs for Fine-grained Category Detection," Springer International Publishing, Cham., Jul. 2014, 16 pgs.
Zhang, Z. et al., "Facial Landmark Detection by Deep Multi-task Learning," 13th European Conference on Computer Vision (ECCV), Sep. 2014, 15 pgs.
Hirano et al., "Study and Implementation of Display Method of Judgment Result in Self-Practice System for Drum Practitioners", IEICE Technical Report, vol. 114, No. 305, The Institute of Electronics, Information and Communication Engineers, Nov. 7, 2014, pp. 196-197, 19-24.

(56) References Cited

OTHER PUBLICATIONS

Office Action, and translation thereof, from counterpart Japanese Application No. 2023-019137 dated Mar. 19, 2024, 13 pp.

Suneya et al., "Curvilinearization of 3D Behavior Trajectory by RGBD Camera for Technical and Performing Arts Tradition", Proceedings of the 15th Conference of the Society of Instrument and Control Engineers, Systems Integration Division, Dec. 14, 2014, pp. 67-71, Translation provided for only the Abstract.

Umemura et al., "Analysis of the finger movements of skilled workers in glass fire processing work", IEICE Technical Report, vol. 109, No. 83, Jun. 8, 2009, pp. 7-12.

\* cited by examiner

MACHINE LEARNING SYSTEM FOR TECHNICAL KNOWLEDGE CAPTURE

This application claims the benefit of U.S. Provisional Application No. 62/952,658, filed Dec. 23, 2019, the entire contents of which is incorporated herein by reference.

TECHNICAL FIELD

This disclosure generally relates to machine learning systems and, more specifically, to machine learning for knowledge capture.

BACKGROUND

Workplaces use training programs to train employees to develop knowledge or skills to improve performance in the employees' roles. However, the more complex the task, the more training required to successfully teach an employee to perform the task. Training a new employee to perform a highly complex task can be both expensive and time-consuming. As another example, a workplace may use a subject matter expert (SME) to teach the trainee to perform a particular task. An SME is an individual, often an employee or consultant, who possesses a deep understanding of a particular job, process, department, function, technology, machine, material or type of equipment. Typically, the SME cultivates expertise through a combination of experience and training, which may take the SME many years to develop.

Some workplaces may train employees by having an SME create a training video or written instruction guide to teach the employee to perform a particular task. However, videos and instruction guides may be disadvantageous because the employee cannot ask questions. Further, the SME may accidentally or unknowingly omit key information. Furthermore, global companies spend a large amount of time and budget creating such multimedia technical manuals for training employees, which may be made more expensive when the desired skillset involves highly specialized tasks, implicit knowledge, or multiple languages. As another example, a workplace may have an employee observe the SME while the SME performs the task. Observing the SME, or "shadowing," can be valuable for the employee but is infeasible for large groups of employees and may disrupt the SME's efficiency. In a similar fashion to training videos, the SME may inadvertently omit verbal descriptions of minute, yet important, details related to the task they are demonstrating. Further, a workplace may have an employee attend a training session in a classroom environment, but such a classroom environment may not provide valuable hands-on experience for technical tasks. Furthermore, for highly complex tasks or in specialized fields, there may not exist many SMEs that are available to help train new employees to perform the tasks.

SUMMARY

In general, the disclosure describes machine learning techniques for capturing human knowledge for performing a task to build or refine a domain model usable for training others to perform the task. In one example, a video device obtains video data of a first user performing the task. In some examples, the first user is an SME performing the task. The video data may include multiple camera sources, such as video data of a first-person perspective viewpoint of the first user and/or a third-person perspective viewpoint of the first user. An audio input device obtains audio data describing performance of the task. In some examples, the audio data comprises a narrative by the first user of the first user's actions while performing the task. In other examples, the audio data comprises a narrative of how to perform the task that the first user narrates while the first user is not performing the task. In some examples, one or more sensors generate sensor data during performance of the task by the first user. In some examples, the sensor data comprises accelerometer, pressure, or force data related to movements or actions taken by the first user, interactions between the first user and one or more objects, such as tools, workpieces, etc. In some examples, a document processing unit may obtain textual data describing performance of the task, such as from instruction manuals, parts lists, or other written guides.

In some examples, a computation engine applies a machine learning system to the collected data (e.g., the video data, audio data, sensor data, and/or textual data) to update a domain model defining performance of the task. As described herein, a task may be conceptualized as a plurality of steps undertaken to achieve a given objective. In some examples, the machine learning system updates the domain model by correlating objects recognized in the video data to references to the objects within the audio data and/or the textual data as well as measurements in the sensor data so as to identify portions of the video data, portions of the audio data, portions of the sensor data, and portions of the textual data that describe a same step in a plurality of steps for performing the task. For example, a pressure sensor on a plate may record how much pressure an SME is applying to the plate in additional to verbal description from an SME describing his movements. A training unit applies the updated domain model to generate training information for performing the task. In some examples, the training unit forms a knowledge database that stores the training information. The training information comprises, for example, video data, audio data, sensor data, and textual data cross-referenced to one another such that a second user may search the knowledge database by concept, task, or sub-task to obtain training information related to the second user's query. An output device outputs the training information for use in training the second user to perform the task. In some examples, the second user is a novice. In some examples, the output device outputs the training data in the form of an augmented reality video that depicts, from a first-person perspective of the second user, performance of the task.

The techniques of the disclosure may provide specific technical improvements to the computer-related field of machine learning that have practical applications. For example, the techniques set forth herein may enable a machine learning system to fuse multi-modal data sources of a first user performing a complex task to generate training information useful for training a second user to perform the complex task. For example, the techniques of the disclosure may enable a machine learning system to capture data from an SME performing a complex task so as to allow the creation of training materials useful for others (such as a novice user) to perform the complex task. Further, the techniques of the disclosure may enable a machine learning system to identify important information in performing a task that may be subjective or difficult to convey by capturing various aspects of the SME's performance of the task that may be unknown, unrecognized, or subjective to the SME when asked to describe the task. Therefore, the techniques of the disclosure may enable the creation of highlyfocused, experiential training information that may increase the efficiency and reduce the cost of training employees to perform complex tasks.

In one example, this disclosure describes a system for capturing knowledge for performing a task, the system comprising: a domain model defining performance of the task; a video input device configured to obtain video data of a first user performing the task; an audio input device configured to obtain audio data describing performance of the task; one or more sensors configured to generate sensor data during performance of the task; a computation engine configured to: correlate at least a portion of the video data to at least a portion of the audio data and at least a portion of the sensor data; and process the correlated at least a portion of the video data, the at least a portion of the audio data, and the at least a portion of the sensor data to update the domain model defining performance of the task; a training unit configured to apply the updated domain model to generate training information for performing the task; and an output device configured to output the training information for use in training a second user to perform the task.

In another example, this disclosure describes a method for capturing knowledge for performing a task, the method comprising: obtaining, by a video input device, video data of a first user performing the task; obtaining, by an audio input device, audio data describing performance of the task; generating, by one or more sensors, sensor data during performance of the task; correlating, by a computation engine, at least a portion of the video data to at least a portion of the audio data and at least a portion of the sensor data; processing, by the computation engine, the correlated at least a portion of the video data, the at least a portion of the audio data, and the at least a portion of the sensor data to update a domain model defining performance of the task; applying, by a training unit, the updated domain model to generate training information for performing the task; and outputting, by an output device, the training information for use in training a second user to perform the task.

In another example, this disclosure describes a non-transitory, computer-readable medium comprising instructions that, when executed, are configured to cause processing circuitry to: obtain video data of a first user performing the task; obtain audio data describing performance of the task; generate sensor data during performance of the task; correlate at least a portion of the video data to at least a portion of the audio data and at least a portion of the sensor data; process the correlated at least a portion of the video data, the at least a portion of the audio data, and the at least a portion of the sensor data to update a domain model defining performance of the task; apply the updated domain model to generate training information for performing the task; and output the training information for use in training a second user to perform the task.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
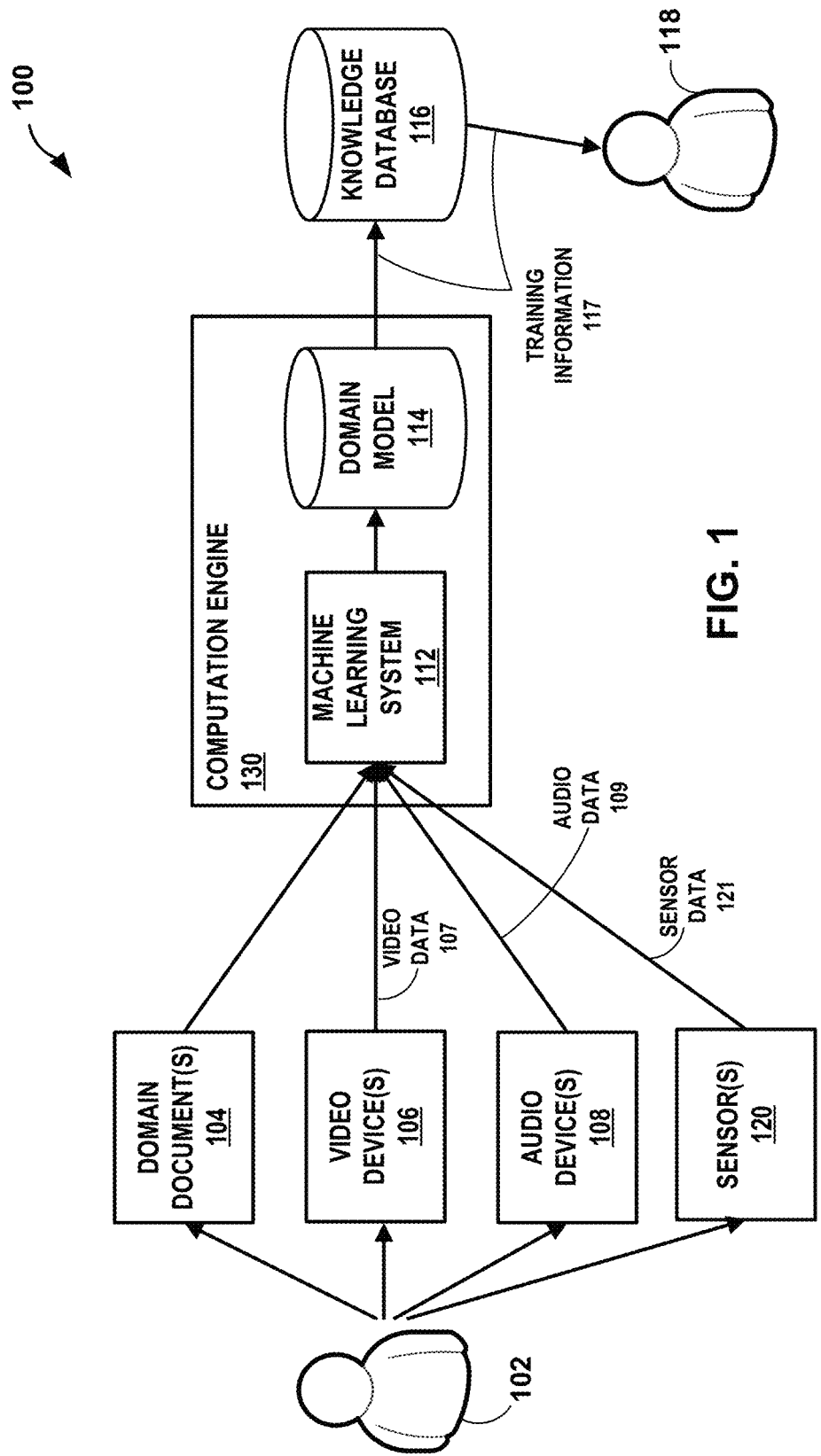
FIG. 1 is a block diagram illustrating an example system for generating training information in accordance with the techniques of the disclosure.

Knowledge capture is the process whereby knowledge is converted from tacit to explicit forms. "Tacit" or "implicit" knowledge is a type of knowledge that is contained or embodied within SMEs who, either through their sheer talent or accumulated experiences, possess institutional knowledge in a particular area or field or directed to a particular organization or organizational area. Examples of implicit knowledge, for example, are knowledge that is hard to explain such as auditory, visual, touch, smell, taste, or other sensory knowledge that has very small differences (e.g., slight differences between the performance of a same task by two different SMEs), or knowledge involving changes that can occur across multiple different sensory areas simultaneously and are interconnected with one another. An SME may not be able to identify the whole sum of tacit knowledge he or she possesses. In contrast to tacit knowledge, "explicit" forms or explicit knowledge is knowledge that one may readily articulate, codify, store, or access. An SME may easily transmit explicit knowledge to others, whereas tacit knowledge may not necessarily be easily transferred. It would be extremely valuable to be able to quickly capture tacit knowledge for later use. As described herein, techniques are set forth which enable the capture of both explicit and tacit knowledge to generate training information, thereby speeding up the knowledge capture process, enabling the ability to create interactive multi-media instruction manuals, as well as providing augmented reality content in different languages by applying artificial intelligence (AI) and/or machine learning (ML).

Conventionally, an SME creates documents or videos as a way to transfer knowledge e.g., that may be used to train others, such as novices. Creating content in this manner is very time-consuming. Further, it may be difficult for a trainee to locate relevant information within a large amount of training content. The techniques set forth herein enable a system to capture implicit knowledge, as well as explicit knowledge, from an SME. In an example of the techniques set forth herein, a system includes one or more 3D video cameras for capturing activities of an SME (e.g., such as a maintenance process, a machining activity, or a crafting activity), in both a first-person perspective view and a third person perspective view. Such a system further includes one or more microphones that are configured to capture dictation as the SME perform the activities. Subsequently, a computation engine that uses, e.g., AI and/or ML, performs a series of steps to convert the captured data into training information. In some examples, the computation engine uses AI to apply design patterns to the data so as to generalize the activity (also referred to herein as a "task") into one or more steps for performing the activity. Furthermore, the computation engine may use AI and/or ML to guide the SME with well-defined processes, so that the AI and/or ML may aid in an active learning process. In some examples, the system generates sets of questions that may be posed to the SME to elicit training-oriented information. For example, the system may query an SME to state the objective of a presentation, provide a brief description of the activity, and/or lay out end goals of the process prior to describing and/or demonstrating the process. Furthermore, the system may query the SME for explanation of any deviations from normal procedures and a reasoning for such deviations.

In some examples, the computation engine of a system as described herein may apply AI to understand information within videos from the multiple cameras at different angles and build 3D models from such information. In some examples, the system may perform activity recognition on hand operations of the SME. While conventional systems may focus on global human motions, such as sitting, standing, walking, etc., a system as described herein may capture finer hand motions such as finger movements, wrist rotation, hand/finger pressure applied to a tool, and/or fine tool movements. Such a system as set forth herein therefore provides for improved accuracy by using multiple 3D cameras to obtain a close-up view of the SME during performance of the activity or task. In some examples, the system further includes one or more sensors, e.g., worn or incorporated into wearable garments, that capture motion data from the SME, which the system uses in conjunction with obtained audio and video data to aid in capturing gestures and movements of the SME that may be shown to a trainee. For example, where a task comprises maintenance of a particular machine, the system may depict very fine hand operations, such as a particular way to clean an object, unscrew a bolt, remove a disc, check flatness by using a dial gauge, etc. In some examples, the system captures performance of such tasks from the perspective of the SME and plays back the performance of the task for the trainee in the form of augmented reality content. In other examples, the computation engine uses ML with or without AI to decipher data from video and audio sources and to capture information.

In some examples, the computation engine applies an AI and/or ML component to integrate narration by the SME, as well as visual entities, actions, and concepts obtained via video, audio, or sensor data. A system as described herein may extract information from audio data, e.g., dictation by the SME related to the task, with minimal training examples. A system as described herein may also use textual data obtained from domain documents pertaining to the task, when available, as well as apply rule-based approaches where no such documentation for the task exists. In some examples, a system as described herein fuses audio data, such as a narrative explanation or dictation by the SME with analysis of video data of the SME performing the task in different sequences. Further, the SME may provide such narratives of action-related information at any time (e.g., prior to, during, or after performing the task). When an SME makes a dictation into a video record, the system described herein may correlate objects depicted in the video data to references to such objects described via audio recording. For example, the system identifies, from audio data, a statement by an SME that for a particular procedure, the SME ensures that a flatness measurement of an object is within 4 microns. The audio data may include this statement before the SME performs a check operation, in the middle of performance of the check operation by the SME, or after the SME performs the check operation. A system as described herein identifies a correlation between the statement by the SME to an object recognized in in the video data to align the multiple sources of information regardless of a time period when the pertinent statement occurs in the audio data or a time period when the related object is identified in the video data.

In further examples, the system may identify a correlation between an action taken by the first user with respect to one or more objects depicted in the video data and one or more measurements obtained via one or more sensors. For example, the system may correlate an action depicted in the video data with accelerometer, pressure, or force measurements sensed from a tool used by the first user and generated contemporaneously with a time period when the one or more objects are identified in the video data.

In some examples, the computation engine may apply AI and/or ML to perform other valuable tasks. For example, a system as described herein may use AI to transform task learning steps to generalized steps or to identify and flag missing or unclear segments in description of the task. For example, a system as described herein may identify missing information based on a given domain model for the task. As an example, the system may begin with a task that has an objective to calibrate instrument usage and check ranges of one or more readouts of the instrument. The system categorizes dictation from the SME into various categories, such as task goals, safety, supplemental explanation for a current action by the SME, and so on.

A system as described herein may perform object recognition to recognize objects in video data with minimal training examples. The system described herein may achieve this by identifying objects in a first video and leveraging this knowledge across multiple subsequent videos. In some examples, the system described herein uses a recognition of multiple operations performed close to one or more objects to increases the accuracy of the identification of the one or more objects. Further, the system described herein updates a domain model for the task and applies the domain model to generate training information for use in a second user to perform the task. In some examples, the system may use audio data or textual data obtained from the SME in a first language (e.g., Japanese) and generate training information in a second language (e.g., English) for use in training a second user to perform the task. Thus, a system as described herein may leverage pre-existing documents created by the company or available from external sources to arrive at useful terminologies for training users that do not share a language with the SME. In some examples, the techniques of the disclosure set forth herein may speed up knowledge capture by three or more times greater than conventional knowledge capture techniques.

FIG. 1 is a block diagram illustrating example system 100 for generating training information in accordance with the techniques of the disclosure. System 100 comprises one or more video devices 106, one or more audio devices 108, one or more sensors 120, machine learning system 112, domain model 114, and knowledge database 116.

In accordance with the techniques of the disclosure, first user 102 performs a task (e.g., an activity). In some examples, first user 102 is an SME performing the task. The task may be, for example, a task to perform maintenance or cleaning of an industrial machine, a task to use an industrial machine to machine or craft a machine part, consumer good, or piece of art, a task that involves performance with a musical instrument, or any other task that requires practice, training, or expertise not expressly described herein. Video devices 106 generate video data 107 of first user 102 performing the task. Audio devices 108 generate audio data 109 describing performance of the task. Further, sensors 120 generate sensor data 121 of performance of the task. Machine learning system 112 of computation system 130 receives video data 107, audio data 109, and sensor data 121, as well as domain documents 104, and processes data obtained from data 104, 107, 109, and 121 to update domain model 114, which defines performance of the task. Computation engine 130 applies domain model 116 to generate training information 117 for performing the task and stores training information 117 in knowledge database 116. Second user 118 may access training information 117 stored in knowledge database 116 to train second user 118 in performing the task.

As depicted in FIG. 1, video devices 106 generate video data 107 of first user 102 performing the task and provide such video data 107 to machine learning system 112. Video data 107 may include multiple camera sources. For example, video devices 106 comprise a first video device and a second video device. The first video device is configured to obtain video data of first user 102 performing the task from a first-person perspective viewpoint of first user 102. The second video device is configured to obtain video data of first user 102 performing the task from a third-person perspective viewpoint of first user 102. In other examples, video devices 106 may comprise multiple video devices positioned at a first-person perspective viewpoint of first user 102 as well as multiple video devices positioned at various third-person perspective viewpoints of first user 102 (e.g., in various different positions or poses in a room or environment in which first user 102 performs the task). In some examples, video data 107 comprises machine vision of very close, 3D changes of a surface, color of a workpiece. The use of multiple cameras from multiple perspectives enables the creation of video data 107 that is more comprehensive and more informative to machine learning system 112 in understanding the interactions of first user 102 with the environment, tools, or workpieces, as described in more detail below.

Each video device 106 is an example of an image capture device that produces a plurality of two-dimensional (2D) frames from a pose of the video device 106. In some examples, video device 106 may be another type of image capture device that generates, for a scene, 2D or 3D images, and may be a video camera, a laser scanner or other optical device that produces a stream of image data, a depth sensor that produces image data indicative of ranges for features within the environment, a stereo vision system having multiple cameras to produce 3D information, a Doppler radar, or other image capture device. In some examples, video devices 106 comprise a three-dimensional (3D) camera. Such a 3D camera is capable of recording 3D video via the use of two or more image capture devices positioned at different angles to obtain video data from multiple poses and in multiple dimensions. The frames generated by video devices 106 may represent two-dimensional images generated periodically, on-demand, as frames of a video stream, and so forth. These 2D frames may be of various resolutions and generated in various formats that may be processed by various units of system 100.

Audio devices 108 generate audio data 109 describing performance of the task and provide such audio data 109 to machine learning system 112. In some examples, audio data 109 comprises a narrative by first user 102 describing the first user's actions while performing the task. In other examples, audio data 109 comprises a narrative by first user 102 describing how to perform the task while the first user is not performing the task, e.g., such as during an initial interview of first user 102 before performing the task or a post interview of first user 102 after performing the task. An example of audio devices 108 includes a microphone, such as a dynamic microphone, a condenser microphone, or a contact microphone. However, the techniques of the disclosure may use other devices for obtaining or recording audio during performance of the task not expressly described here.

Sensors 120 generate sensor data 121 of performance of the task. Sensors 120 may include, e.g., one or more motion, pressure, force, or acceleration sensors. In some examples, sensors 120 generate sensor data obtained from first user 102, a workspace of first user 102, or one or more objects with which first user 102 interacts, such as one or more tools or workpieces, during performance of the task. In some examples, sensor data 121 comprises data related to at least one of micromovements or actions of first user 102. In some examples, sensor data 121 comprises data related to one or more objects with which first user 102 interacts during performance of the task. In some examples, sensor data 121 comprises data related to one or more finger or hand movements of the first user, a wrist rotation of the first user, or a hand pressure or a finger pressure of the first user applied to one or more objects. In some examples, sensor data 121 comprises data related to one or more of: an angle between one or more tools and the one or more object; a pressure exerted on the one or more objects; a surface feature of the one or more objects; or an acceleration of the one or more objects.

For example, sensors 120 may be worn by first user 102 or incorporated into articles worn by first user 102, e.g., motion tracking gloves that detect motion and/or force of a finger, hand, and/or arm of the user. In some examples, sensors 120 are incorporated into one or more tools used by first user 102, e.g., smart tools that incorporate one or more pressure sensors for detecting a motion and force of the tool during use by the user. In some examples, sensors 102 are external sensors that sense data related to first user 102, a workspace of first user 102, or an object with which first user 102 interacts, such as a force pad that detects force applied by a user to a surface, an inertial measurement unit (IMU) that detects acceleration of, e.g., a work surface, workpiece, tool, or first user 102. In some examples, sensors 102 include wearable gloves with accelerometers that allow the creation of a 3D model of the body or hand movements of first user 102.

Domain documents 104 comprise textual data describing performance of the task. Examples of domain documents 104 include an instruction manual for performing the task, a parts lists of parts needed to perform the task, a tool lists of tools needed to perform the task, defect reports, machine information, or other written guides. First user 102 may provide domain documents 104 to computation engine 130, which performs text recognition to extract the textual data describing performance of the task and provides such textual data to machine learning system 112.

Domain model 114 provides a model of the task performed by first user 102. Typically, domain model 114 integrates knowledge from a first user 102, where the first user can be one or more SMEs. In some examples, domain model 114 is initially generated during an interview process with first user 102 that is structured to rapidly define a basic model of expert decision-making during performance of the task and/or procedural skills in mechanical, technical, and artisanal domains related to performance of the task. In some examples, the interview process may take the form of a first-person narrative by first user 102 describing a step-by-step process for performing of the task, problems that first user 102 may encounter, solutions to such problems, techniques that first user 102 implements during performance of the task, or details to which first user 102 deems important to be attentive. Typically, the interview is structured to elicit both explicit and implicit knowledge. For example, the interview may take the form of a narrative describing performance of the task given by the SME to elicit explicit knowledge followed by a series of follow-up questions to elicit implicit knowledge. Implicit knowledge questions are typically exploratory. For example, an exploratory question designed to elicit implicit knowledge may ask "What does one check before starting the step?" or "How does one measure progress?" One may ask additional follow-up questions based on the answer provided by first user 102.

In some examples, computation engine 130 may initially generate domain model 114 from documents pertaining to the task. In some examples, computation engine 130 may apply rule-based approaches to generating or updating domain model 114. For example, domain model 114 may specify a rule that calibration of a tool should be performed before using the tool to perform a measurement. Computation engine 130 may use such a rule to identify or ascertain a step in performing a task or to identify a missing step in performance of the task modeled by domain model 114. In some examples, a first user 102 (e.g. one or more SMEs), provides such rules, which are codified in domain model 114.

Machine learning systems may be used to process images to generate various data regarding the image. For example, a machine learning system may process an image to identify one or more objects in the image. Some machine learning systems may apply a model generated by a neural network, such as a convolutional neural network, to process the image. Machine learning systems may require a large amount of "training data" to build an accurate model. However, once trained, machine learning systems may be able to perform a wide variety of image-recognition tasks previously thought to be capable only by a human being. For example, machine learning systems may have use in a wide variety of applications, such as security, commercial applications, scientific and zoological research, and industrial applications such as inventory management and quality control.

Computation engine 130 applies machine learning system 112 to the collected data (e.g., domain documents 104, video data 107, audio data 109, and/or sensor data 121) to update or refine domain model 114 defining performance of the task. In some examples, domain documents 104, video data 107, audio data 109, and/or sensor data 121 are converted into vectors and tensors (e.g., multi-dimensional arrays) upon which machine learning system 112 may apply mathematical operations, such as linear algebraic, nonlinear, or alternative computation operations. In some examples, machine learning system 102 applies techniques from the field of deep learning. In some examples, machine learning system 102 is an example of a supervised learning system, an unsupervised learning system, a semi-supervised learning system, or a reinforcement learning system.

Machine learning system 112 may be initialized by training machine learning system 112 with training sample data (not depicted in FIG. 1) that comprises video, textual, audio, and/or sensor data. In some examples, machine learning system 112 uses such training sample data to teach a machine learning model to identify elements depicted in the video, textual, audio, and/or sensor data and determine whether such elements are more or less likely to be related to one another by training machine learning system 112 to assign different weights to various elements, apply different coefficients to such elements, etc.

In some examples, machine learning system 112 updates domain model 114 by correlating objects recognized in video data 107 to references to the objects within audio data 108, textual data obtained from domain documents 104, and/or sensor data 121 so as to identify portions of video data 107, portions of audio data 109, portions of the textual data, and/or portions of sensor data 121 that describe a same step in a plurality of steps for performing the task. In some examples, machine learning system 112 performs task learning to generalize a task performed by first user 102 into one or more steps. In some examples, machine learning system 112 may apply one or more templates to generalize the task by first user 102 into one or more steps.

Computation engine 130 applies domain model 116 to generate training information 117 for performing the task and stores training information 117 in knowledge database 116. Second user 118 may access training information 117 stored in knowledge database 116 to train second user 118 in performing the task. Training information 117 comprises, for example, portions of video data, audio data, textual data, and sensor data of the performance of the task that has been cross-referenced to one another such that a second user may search knowledge database 116 by concept, task, or sub-task to obtain training information related to the second user's query. For example, training information 117 may comprise an object recognized in video data 107, a portion of audio data 109 describing the object that is recognized in video data 107, a portion of domain documents 104 pertaining to the object that is recognized in video data 107, and/or sensor data obtained from sensors 120 during performance of a step in the task that relates to the object that is recognized in video data 107. In some examples, training data 117 is personalized for second user 118. In some examples, knowledge database 116 outputs training information 117 to second user 118 for use in training second user 118 to perform the task. In some examples, knowledge database 116 outputs training information 117 in the form of an augmented reality video that depicts, from a first-person perspective of second user 118, performance of the task. In other examples, knowledge database 116 outputs training information 117 in the form of an interactive technical manual for training second user 118 to perform the task.

In some examples, knowledge database 116 receives, from second user 118, a query for instructions for performing the task or a step of a plurality of steps for performing the task. In response to the query, knowledge database 116 applies domain model 114 to generate training information 117 for performing the task or the step of a plurality of steps for performing the task and outputs such training information 117 to second user 118. For example, given a current state of domain model 114 derived from a procedure modeled for the task and data observed from the environment of system 100, computation engine 130 may use domain model 114 to predict or identify a next step to be performed by second user 118 and suggest performance of such next step. Therefore, computation engine 130 may use domain model 114 to identify a next step that an SME would perform in performing the task and suggest such a step to, e.g., second user 118 to train second user 118 to perform the task. Furthermore, computation engine 130 may use domain model 114 to compare steps performed by, e.g., a novice user versus steps performed by an SME, to evaluate performance of the novice user.

Figure 2:
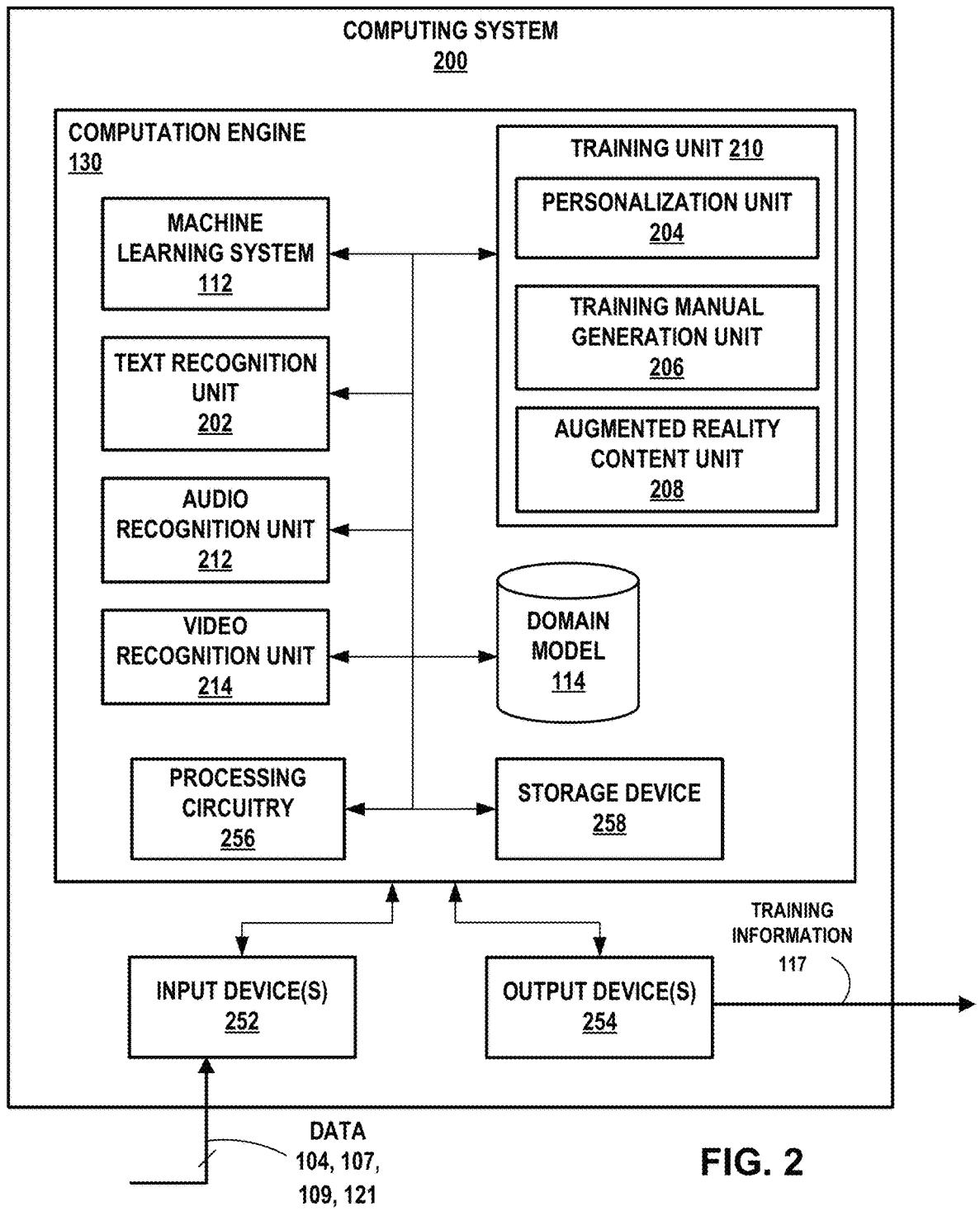
FIG. 2 is a block diagram illustrating an example computing system for generating training information in accordance with the techniques of the disclosure.

FIG. 2 is a block diagram illustrating example computing system 200 for generating training information in accordance with the techniques of the disclosure. In the example of FIG. 2, computing system 200 includes computation engine 130, one or more input devices 252, and one or more output devices 254. In some examples, computing system 200 includes one or more computing devices interconnected with one another, such as one or more mobile phones, tablet computers, laptop computers, desktop computers, servers, Internet of Things (IoT) devices, etc. In some examples, computing system 200 is a single computing device. In some examples, computing system 200 is distributed across a plurality of computing devices and interconnected by a computer network (e.g., implemented as a cloud-based application).

In the example of FIG. 2, computing system 200 may provide user input to computation engine 130 via one or more input devices 252. A user of computing system 200 may provide input to computing system 200 via one or more input devices 252, which may include a keyboard, a mouse, a microphone, a touch screen, a touch pad, or another input device that is coupled to computing system 120 via one or more hardware user interfaces. Furthermore, computing system 200 may receive, via input devices 252, data from various other sources, such as domain documents 104 of FIG. 1, video data 107 via one or more video devices 106 of FIG. 1, audio data 109 via one or more audio devices 108 of FIG. 1, or sensor data 121 via one or more sensors 120 of FIG. 1, which are processed by various components of computation engine 130 as described in more detail below.

Input devices 252 may include hardware and/or software for establishing a connection with computation engine 130. In some examples, input devices 252 may communicate with computation engine 130 via a direct, wired connection, over a network, such as the Internet, or any public or private communications network, for instance, broadband, cellular, Wi-Fi, and/or other types of communication networks, capable of transmitting data between computing systems, servers, and computing devices. Input devices 252 may be configured to transmit and receive data, control signals, commands, and/or other information across such a connection using any suitable communication techniques to receive the sensor data. In some examples, input devices 252 and computation engine 130 may each be operatively coupled to the same network using one or more network links. The links coupling input devices 252 and computation engine 130 may be wireless wide area network link, wireless local area network link, Ethernet, Asynchronous Transfer Mode (ATM), or other types of network connections, and such connections may be wireless and/or wired connections.

Output device 254 may include a display, sound card, video graphics adapter card, speaker, presence-sensitive screen, one or more USB interfaces, video and/or audio output interfaces, or any other type of device capable of generating tactile, audio, video, or other output. Output device 254 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 254 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 254 may include a presence-sensitive display that may serve as a user interface device that operates both as one or more input devices and one or more output devices. In some examples, output device comprises one or more interfaces for transmitting data to another computing device over a wired or wireless connection.

Computation engine 130 includes machine learning system 112, domain model 114, text recognition unit 202, audio recognition unit 212, video recognition unit 214, and training unit 210. Each of components 112, 114, 202, 210, 212, and 214 may operate in a substantially similar fashion to the like components of FIG. 1. Computation engine 130 may represent software executable by processing circuitry 256 and stored on storage device 258, or a combination of hardware and software. Such processing circuitry 256 may include any one or more of a microprocessor, a controller, a digital signal processor (DSP), an application specific integrated circuit (ASIC), a field-programmable gate array (FPGA), or equivalent discrete or integrated logic circuitry. Storage device 258 may include memory, such as random-access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

Text recognition unit 202 receives domain documents 104 and performs text recognition to obtain textual data suitable for use by machine learning system 112. Examples of domain documents 104 include an instruction manual for performing the task, a parts lists of parts needed to perform the task, a tool lists of tools needed to perform the task, instruction manuals for each of the tools used in performance of the task, schematics or specifications for a finished product, written narratives provided by an SME, or other written guides. In some examples, text recognition unit 202 may obtain domain documents 104 from first user 102 (e.g., an SME), from a repository of technical documentation (e.g., maintained by the company or by external sources such as the Internet), from other users, etc. In some examples, text recognition unit 202 implements a machine learning system to perform text recognition on domain documents 104. In some examples, text recognition unit 202 uses off-the-shelf text recognition software to perform text recognition on domain documents 104.

Video recognition unit 214 receives video data 107 from video devices 106 of FIG. 1 and performs object recognition to identify one or more objects depicted in video data 107. In some examples, video recognition unit 214 identifies first user 102, one or more tools used by first user 102, one or more workpieces with which first user 102 interacts, etc. In some examples, video recognition unit 214 processes video data 107 to generate video data labeled with human pose, object, or activity sequence annotations. For example, video recognition unit 214 annotates video data 107 with human pose data of first user 102, including skeletal pose data, joint recognition, hand gesture recognition, etc.). In some examples, video recognition unit 214 annotates video data 107 with object detection data, such as annotations of human skeleton or joints detected in frames of video data 107, or annotations of objects, such as tools, workpieces, etc. recognized in frames of video data 107. In some examples, video recognition unit 214 determines a confidence score or probability that a frame of video data 107 depicts a particular object. For example, video recognition unit 214 may annotate each frame in video data 107 with one or more objects recognized to be depicted within the frame. The use of multiple cameras from multiple perspectives enables the creation of video data 107 that is more comprehensive and more informative to machine learning system 112 in understanding the interactions of first user 102 with the environment, tools, or workpieces. For example, video data from multiple angles may assist in object recognition by reducing instances of object occlusion and provide close views of movements by the SME, tools, or workpieces from multiple perspectives. For example, video recognition unit 214 may use an object recognized in video data from a first video device 106 to assist in identifying an object, such as a partially occluded object, present in a second video device 106. Furthermore, video recognition unit 214 may apply AI to smooth out object identification when a recognized action sequence is performed very close to two objects. Video recognition unit 214 uses such video data 107 from multiple perspectives to build a 3D model of the environment, including first user 102, tools, and workpieces, as well as modeling the interactions between first user 102 and such tools and workpieces. In some examples, video recognition unit 214 uses a machine learning system to perform human pose detection and/or object recognition on video data 107. In some examples, video recognition unit 214 uses off-the-shelf object recognition software to perform human pose detection and/or object recognition on video data 107.

Audio recognition unit 212 receives audio data 109 from audio devices 108 of FIG. 1 and performs speech recognition to identify references to one or more objects or concepts present within audio data 109. In some examples, audio data 109 comprises a narrative by first user 102 describing the first user's actions while performing the task. In other examples, audio data 109 comprises a narrative by first user 102 describing how to perform the task while the first user is not performing the task, e.g., such as during an interview of first user 102 before or after performing the task. In some examples, audio recognition unit 212 uses machine learning to perform speech recognition on audio data 109. In some examples, audio recognition unit 212 uses off-the-shelf speech recognition software to perform speech recognition on audio data 109.

Machine learning system 112 correlates video data 107, audio data 109, sensor data 121, and textual data obtained from domain documents 104 to identify at least a portion of video data 107, audio data 109, sensor data 121, and textual data obtained from domain documents 104 that describe a same step of the plurality of steps for performing the task. Further, machine learning system 112 processes the correlated portions of video data 107, audio data 109, sensor data 121, and textual data obtained from domain documents 104 to update domain model 114. As described herein, a task may be conceptualized as a plurality of steps undertaken to achieve a given objective. Therefore, domain model 114 defines performance of the task by defining a plurality of steps or operations performed by first user 102 to achieve a goal of the task. In some examples, the domain model 114 defines performance of the task by defining at least one of an ontology, a cluster of related concepts or objects, an entity, an action, an event, or a rule (e.g., a semantic rule) related to performance of the task. In some examples, domain model 114 models performance of the task by defining at least one of an ontology, a cluster of related concepts or objects, an entity, an action, an event, or a rule (e.g., a semantic rule) related to performance of the task. An ontology is a semantic relationship between various objects and may be created by machine learning system 112 or created by hand by an SME, such as first user 102. Machine learning system 112 may perform clustering to detect a group of related terms, concepts, or objects by identifying relationships present within video data 107, audio data 109, and textual data obtained from domain documents 104. Machine learning system 112 may identify entities through the use of object detection performed on video data 107 and semantic extraction of text from textual data obtained from domain documents 104. Machine learning system 112 may identify events (e.g., actions being performed) by performing activity sequence recognition on video data 107 and semantic extraction of text from textual data obtained from domain documents 104. Semantic rules are rules for fusing video data 107, audio data 109, sensor data 121, and textual data obtained from domain documents 104 (e.g., processing video data 107, audio data 109, sensor data 121, and textual data obtained from domain documents 104 to identify relationships amongst entities, objects, and actions present within video data 107, audio data 109, sensor data 121, and textual data obtained from domain documents 104). In some examples, the semantic rules are hand-crafted by an SME, such as first user 102.

As an example, machine learning system 112 may correlate a portion of video data to a portion of audio data by identifying an object depicted in video data 107, identifying, from audio data 109, a reference to the object, and correlating the object depicted in video data 107 to the reference to the object within audio data 109. Machine learning system 112 may then define domain model 114 based on the correlation of the object identified from video data 107 to the reference to the object identified from audio data 109 by using the correlation to define, e.g., an ontology, an entity, an action, an event, or a rule of domain model 114 that defines performance of the task.

In some examples, machine learning system 112 applies co-clustering to extract domain-related semantic information such as task names, objects, tools, etc. from each of video data 107, audio data 109, sensor data 121, and textual data obtained from domain documents 104 to build or extend an ontology of concepts of domain model 114. For example, machine learning system 112 may apply unsupervised machine learning, such as a co-clustering algorithm, to detect clusters of related concepts and terms.

In some examples, machine learning system 112 implements a first machine learning system that correlates video data 107, audio data 109, sensor data 121, and textual data obtained from domain documents 104 to identify at least a portion of video data 107, audio data 109, sensor data 121, and textual data obtained from domain documents 104 that describe a same step of the plurality of steps for performing the task. For example, the first machine learning system identifies, from at least a portion of video data 107, one or more objects used in performing the task. The first machine learning system identifies, from at least a portion of audio data 109, a reference to the one or more objects used in performing the task. The first machine learning system identifies, from the at least a portion of sensor data 121, one or more physical measurements of the one or more objects used in performing the task. The first machine learning system correlate the one or more objects identified from video data 107 to the reference to the one or more objects identified from audio data 109 and the physical measurements of the one or more objects identified from the sensor data 121.

As a further example, machine learning system 112 implements a second machine learning system that processes the correlated video data 107, audio data 109, sensor data 121, and textual data obtained from domain documents 104 to update domain model 114 defining performance of the task. For example, the second machine learning system defines, based on the correlations between video data 107, audio data 109, sensor data 121, and textual data obtained from domain documents 104, an ontology, an entity, an action, an event, or a rule defining performance of the task of described by domain model 114.

Training unit 210 applies domain model 114 to generate training information 117 or use in training another user (e.g., second user 118 of FIG. 1) to perform the task. Training information 117 comprises, for example, video data, audio data, sensor data, and/or textual data pertaining to, e.g., the task, one or more steps of a plurality of steps that comprise the task, or an object (e.g., a tool or workpiece) related to the task, each type of data cross-referenced to each other type of data such that a second user may search the knowledge database by concept, task, or sub-task to obtain audio, video, sensor, or textual information related to the second user's query.

In some examples, training unit 210 outputs, via output devices 254, training information 117 to knowledge database 116 of FIG. 1 to create a repository of training information for use by one or more users. In some examples, training unit 210 outputs, via output devices 254, training information 117 to, e.g., second user 118 of FIG. 1 to train second user 118 to perform the task.

Personalization unit 204 converts training information obtained from first user 102 of FIG. 1 using the techniques set forth above into personalized training information for second user 117. As an example, training unit 210 obtains training information in a first language of first user 102 of FIG. 1. Personalization unit 204 generates, from the training information in the first language of first user 102, training information 117 in a second language of second user 118, which may be more helpful for training second user 118 to perform the task. In some examples, personalization unit 204 may leverage domain documents 104 created by the company in different languages to determine terminologies that may be applied to the elements of domain model 114 in defining the task. In some examples, personalization unit 204 may use off-the shelf translation tools to assist in translating training information 117 from a first language to a second language.

Training manual generation unit 206 converts training information obtained from first user 102 of FIG. 1 using the techniques set forth above into training manuals for use in training second user 118 to perform the task. In some examples, such training manuals may be text documents. In some examples, such training manuals may be interactive, multimedia manuals in the form of textual, audio, and/or video information with which second user 118 may interact to have a more comprehensive or effective training experience.

Augmented reality content unit 208 converts training information obtained from first user 102 of FIG. 1 using the techniques set forth above into augmented reality content for use in training second user 118 to perform the task. Training unit 210 may output such augmented reality content to, e.g., a head-mounted display (HMD) worn by second user 118 to provide an experiential first-person perspective of the performance of the task by the SME. In some examples, the augmented reality content may include relevant portions of audio data 109, such as narration by first user 102 and relevant portions of video data 107, such as a viewpoint of first user 102 as he or she performs the task. In some examples, second user 118 may interact with controllers that provide force-feedback such that the augmented reality content may provide force feedback based on sensor data 121 that replicates performance of the task by first user 102.

Figure 3:
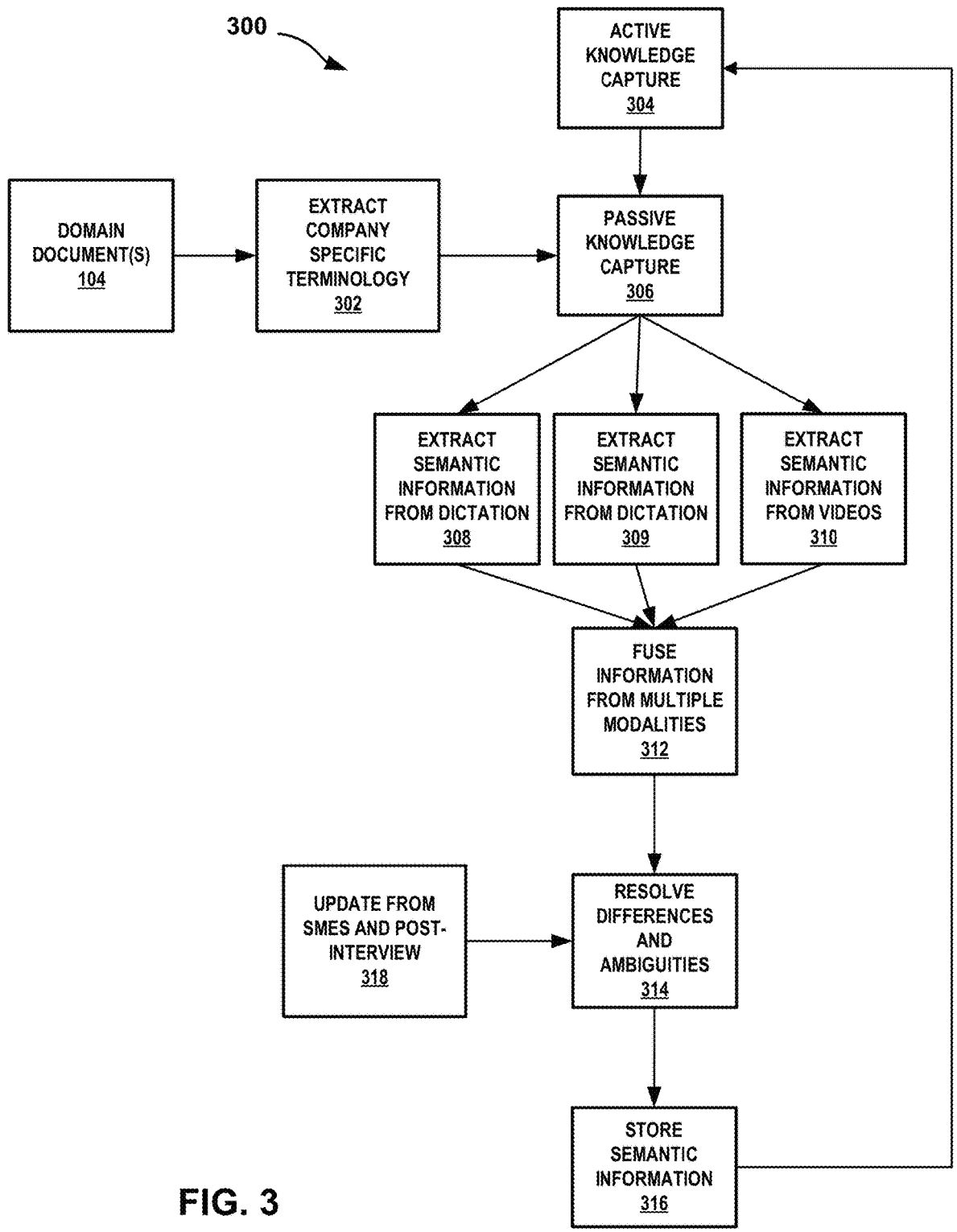
FIG. 3 is a flowchart illustrating an example operation for generating training information in accordance with the techniques of the disclosure.

FIG. 3 is a flowchart illustrating an example operation for generating training information in accordance with the techniques of the disclosure. For convenience, FIG. 3 is described with respect to FIGS. 1 and 2.

As depicted in the operation of FIG. 3, system 100 performs active knowledge capture of first user 102 performing a task (304). Active knowledge capture of first user 102 allows system 100 to capture explicit knowledge of an SME related to performing the task and may also allow for the capture of some implicit knowledge of the SME related to performing the task. In some examples, system 100 performs active knowledge capture in the form of a well-structured interview. In some examples, during active knowledge capture, computation engine 130 generates a set of questions to first user 102 for eliciting training-oriented information. In some examples, the set of questions include an objective of a task, a brief description of the task, end goals of the process, and a demonstration of performance of the task. In some examples, where first user 102 deviates from a normal procedure, computation engine 130 prompts first user 102 to provide an explanation for the deviation and the purpose of the deviation, etc.

For example, video devices 106 obtain video data 107 of first user 102 performing the task. Video data 107 may include multiple camera sources. For example, video devices 106 comprise a first video device and a second video device. The first video device is configured to obtain video data of first user 102 performing the task from a first-person perspective viewpoint of first user 102. The second video device is configured to obtain video data of first user 102 performing the task from a third-person perspective viewpoint of first user 102.

Further, audio devices 108 obtain audio data 109 of first user 102 performing the task. During active knowledge capture, audio data 109 comprises a narrative by first user 102 describing the first user's actions while actively performing the task.

Additionally, sensor devices 120 obtain sensor data 121 of first user 102 performing the task. Sensors 120 may include, e.g., one or more motion, pressure, force, or acceleration sensors. In some examples, sensors 120 are worn by first user 102 or incorporated into articles worn by first user 102, e.g., motion tracking gloves that detect motion and/or force of a finger, hand, and/or arm of the user. In some examples, sensors 120 are incorporated into one or more tools used by first user 102, e.g., smart tools that incorporate one or more pressure sensors for detecting a motion and force of the tool during use by the user. In some examples, sensors 102 are external sensors that sense data related to first user 102, a workspace of first user 102, or an object with which first user 102 interacts, such as a force pad that detects force applied by a user to a surface, an IMD that detects acceleration of, e.g., a work surface, workpiece, tool, or first user 102.

System 100 further performs passive knowledge capture of first user 102 performing a task (304). Passive knowledge capture of first user 102 allows system 100 to capture both explicit and implicit knowledge of the SME related to performing the task. For example, during passive knowledge capture, audio devices 108 obtain audio data 109 comprising a narrative by first user 102 describing how to perform the task while the first user is not performing the task, e.g., such as during an interview of first user 102 before or after performing the task.

Additionally, text recognition unit 202 of computation engine 130 receives textual data in the form of domain documents 104 related to performance of the task. Examples of domain documents 104 include an instruction manual for performing the task, a parts lists of parts needed to perform the task, a tool lists of tools needed to perform the task, or other written guides. Text recognition unit 202 performs text recognition to extract company-specific terminology from domain documents 104 (302). In some examples, Text recognition unit 202 performs text recognition to obtain textual data suitable for use by machine learning system 112. Computation engine 130 may train machine learning system 1112 with such textual data so as to reduce the number of training examples required to train machine learning system 112 to accurately identify tasks and refine useful domain models and/or training information for second user 118. Thus, machine learning system 112, using the techniques of the disclosure, may require only a minimal number of training sample data to provide a useful output (e.g., training information 117 for training second user 118 to perform the task). In some examples, machine learning system 112 is capable of generating training information 117 for training second user 118 to perform the task after capturing knowledge from 3 examples of an SME performing the task and comparing the knowledge captured from the SME to an example of a novice performing the task.

In examples where domain documents 104 are not available for a particular task, machine learning system 112 may instead apply a rule-based approach to process multimodal data to update domain model 114 such that domain model 114 more accurately describes performance of the task. Alternatively or in addition, machine learning system 112 may apply one or more templates to process multimodal data to update or refine domain model 114.

Audio recognition unit 212 receives audio data 109 and extracts, from the dictation of first user 102, first semantic information related to performance of the task (308). For example, audio recognition unit 212 performs speech recognition to identify references to one or more objects or concepts present within audio data 109. In some examples, the dictation of first user 102 includes a description of a machine maintenance activity, such as performing a check operation to ensure that a workpiece has a flatness within 4 microns. First user 102 may provide this narrative prior to, during, or after performing the check operation. As described below, regardless of the chronological occurrence of this description of the check operation by first user 102, machine learning system 112 may correlate this description to an occurrence of this check operation extracted from video data 107. In some examples, audio recognition unit 212 may perform complex speech recognition to extract explicit and implicit knowledge scattered across multiple sentences.

Video recognition unit 214 receives video data 107 and extracts, from video data 107, second semantic information related to performance of the task (310). For example, video recognition unit 214 performs object recognition to identify one or more objects depicted in video data 107. In some examples, video recognition unit 214 identifies first user 102, one or more tools used by first user 102, one or more workpieces with which first user 102 interacts, etc. In some examples, video recognition unit 214 processes video data 107 to generate video data labeled with human pose, object, or activity sequence annotations. In some examples, video recognition unit 214 performs activity recognition on video data 107. Activity recognition may typically be performed to identify human motion such as sitting, standing, walking etc. In the example of FIG. 3, video recognition unit 214 performs activity recognition to identify machine maintenance actions, such as very fine hand operations including cleaning, unscrewing a bolt, removing a disc, checking flatness using a dial gauge, etc. In some examples, video recognition unit 214 may perform complex human pose and/or object recognition to extract explicit and implicit knowledge scattered across multiple different video sources and cross-reference such knowledge to knowledge extracted from audio data 109.

Machine learning system 112 processes sensor data 121 to extract, from sensor data 121, third semantic information related to performance of the task (309). For example, machine learning system 112 may identify portions of sensor data 121 that correspond to micromovements or motions by first user 102 or interactions by first user 102 with one or more objects, such as tools or workpieces.

Machine learning system 112 fuses the information from multiple modalities (312). For example, machine learning system 112 processes video data 107, audio data 109, sensor data 121, and the textual data obtained from domain documents 104 to update domain model 114. Domain model 114 provides a model of the task performed by first user 102. In some examples, domain model 114 models the task as a plurality of steps undertaken to achieve a particular goal. In some examples, domain model 114 models the task by defining at least one of an ontology, a cluster, an entity, an action, an event, or a rule (e.g., a semantic rule) related to performance of the task. For example, machine learning system 112 may correlate a portion of video data 107 to a portion of audio data 109 by identifying an object depicted in video data 107, identifying, from audio data 109, a reference to the object, and correlating the object depicted in video data 107 to the reference to the object within audio data 109. Machine learning system 112 may then define domain model 114 based on the correlation of the object identified from video data 107 to the reference to the object identified from audio data 109 by using the correlation to define, e.g., an ontology, an entity, an action, an event, or a rule of domain model 114 that defines performance of the task.

As another example, machine learning system 112 processes sensor data 121 to synchronize data from each of a plurality of sensors 120 of various types with video data 107 and/or audio data 109. For example, machine learning system 112 may correlate a portion of video data 107 to a portion of sensor data 121 by identifying an action of first user 102 depicted in video data 107, identifying a portion of sensor data 121 generated contemporaneously with the action depicted in video data 107, and correlating the action depicted in video data 107 to the portion of sensor data 121 generated contemporaneously with the action depicted in video data 107. In one example, machine learning system 112 receives, from sensors 120, sensor data 121 describing changes in a surface of a workpiece. Further, machine learning system 112 receives video data 107 annotated with human pose data of first user 102. Machine learning system processes sensor data 121 and video data 107 to correlate the changes in the surface of the workpiece to body movements of first user 102 depicted in the human pose data of video data 107 as well as other machine logs to build a model of physical movements performed by first user 102 to perform one or more steps of a plurality of steps for performing the task.

As another example, machine learning system 112 processes video data 107 and audio data 109 to correlate video data 107 to audio data 109 to identify at least a portion of video data 107 that depicts a step of a plurality of steps for performing the task and at least a portion of audio data 109 that describes the same step of the plurality of steps for performing the task. For example, machine learning system 112 identifies, from the first semantic information obtained from audio data 109 and the second semantic information obtained from video data 107, at least a portion of video data 107 that depicts a step of a plurality of steps for performing the task and at least a portion of audio data 109 that describes the same step of the plurality of steps for performing the task. As described herein, "semantic information" refers to meaningful information about the performance of the task that system 100 obtains from the environment, such as from audio data 109, video data 107, domain documents 104, and sensor data 121. For example, machine learning system 112 may identify, from such first and second semantic information obtained from audio data 109 and video data 107, semantic information such as types of sentences (e.g., an action, a warning, a list of tools, a precondition), as well as an action, object, or a tool derived from an action sentence. Machine learning system 112 fuses such semantic information from, e.g., video data 107, audio data 109, sensor data 121, and domain documents 104, to create a consistent series of semantic steps for performing the task.

In some examples, computation engine 130 identifies ambiguities in one or more steps for performing the task and/or one or more semantic differences or discrepancies in performance of the task (314). For example, computation engine 130 may identify discrepancies between, e.g., video data 107 of performance of the task by first user 102 and audio data 109 which includes a description of performance of the task provided by first user 102. Computation engine 130 may query first user 102 for an explanation of such discrepancies or differences. In some examples, computation engine 130 uses a goal of the task to generate a query to first user 102 for an explanation. For example, computation engine 130 may recognize that usage of an instrument first requires calibration, and an instrument read out always has ranges to check. Therefore, if first user 102 relies on an instrument read out without calibrating the instrument, computation engine 130 may generate a query to first user 102 to explain why. Computation engine 130 may use the explanation of the identified semantic differences between video data 107 and audio data 109 received from first user 102 to update domain model 114 so as to increase the accuracy of domain model 114 and reduce any ambiguity in actions performed by first user 102 during performance of the task.

In some examples, system 100 may capture knowledge for performing a task from a first SME and a second SME by obtaining first video data of the first SME performing the task, first audio data of the first SME narrating performance of the task, second video data of the second SME performing the task, and second audio data of the second SME narrating performance of the task. Machine learning system 112 correlates the first video data of the first SME performing the task to first audio data of the first SME narrating performance of the task. Machine learning system 112 further correlates the second video data of the second SME performing the task to the second audio data of the second SME narrating performance of the task. Machine learning system 112 further processes the correlated video data and audio data of each SME performing the task to identify semantic differences or discrepancies between the performance of the task by the first SME and the performance of the task by second SME. Computation engine 130 queries the first SME and the second SME for an explanation of the semantic differences, and computation engine 130 may update domain model 114 with the resulting explanation of the semantic differences.

In some examples, system 100 may capture knowledge for performing a task from a first user and a second user (e.g., an SME and a novice user, respectively) by obtaining first video data of the SME performing the task, first audio data of the SME narrating performance of the task, second video data of the novice user performing the task, and second audio data of the novice user narrating performance of the task. Computation engine 130 may identify semantic differences or discrepancies between the performance of the task by the SME and second user in a similar fashion as the foregoing example. Further, training unit 210 may generate feedback describing the identified semantic differences between the performance of the task by the SME and the performance of the task by the second user, which output devices 254 may output for display to the second user to guide the second user in performance of the task.

In some examples, system 100 may capture knowledge for performing a task from a first user who is an SME and a second user who is a novice by obtaining first video data of the SME performing the task, first audio data of the SME narrating performance of the task, second video data of the novice performing the task, and second audio data of the novice narrating performance of the task. Computation engine 130 may identify discrepancies or differences between the performance of the task by the SME versus performance of the task by the novice. Further, computation engine 130 may generate queries to the SME for explanations of discrepancies or differences between the actions performed by the SME versus actions performed by the novice, as well as receive, from the SME, annotations of mistakes made by the SME or the novice user. In some examples, computation engine 130 may generate an output depicting a difference in maps of a first SME versus a second SME versus a novice user. For example, computation engine 130 may generate one or more maps that show differences between the first user and the second user to visualize one or more differences between performance of the task by each of the first user and second user. Such maps may include, for example, a pressure applied by each user, a movement of a hand of each user, a body movement of each user, etc. Such maps may enable one to visualize differences between performance of the task by an SME versus performance of the task by a novice user and may be beneficial in assisting a novice user in learning to perform the task.

System 100 may receive responses from, e.g., first user 102 in response to the query to explain ambiguities discussed above. Further, system 100 may receive audio/video information from an SME during a post-task performance interview discussing performance of the task. Machine learning system 112 updates, based on the received explanations and/or post interviews, domain model 114 for the task (318). Training unit 210 stores the semantic information of data model 114 in the form of training information 117 in knowledge database 116 (316).

In some examples, after training information 117 is stored in knowledge database 116, system 100 may repeat operations described above in FIG. 3 to iteratively perform active knowledge capture and passive knowledge capture. In this fashion, system 100 may use existing knowledge capture information to refine the performance of machine learning system 112 and increase the accuracy and detail of training information 117 of knowledge database 116.

Figure 4:
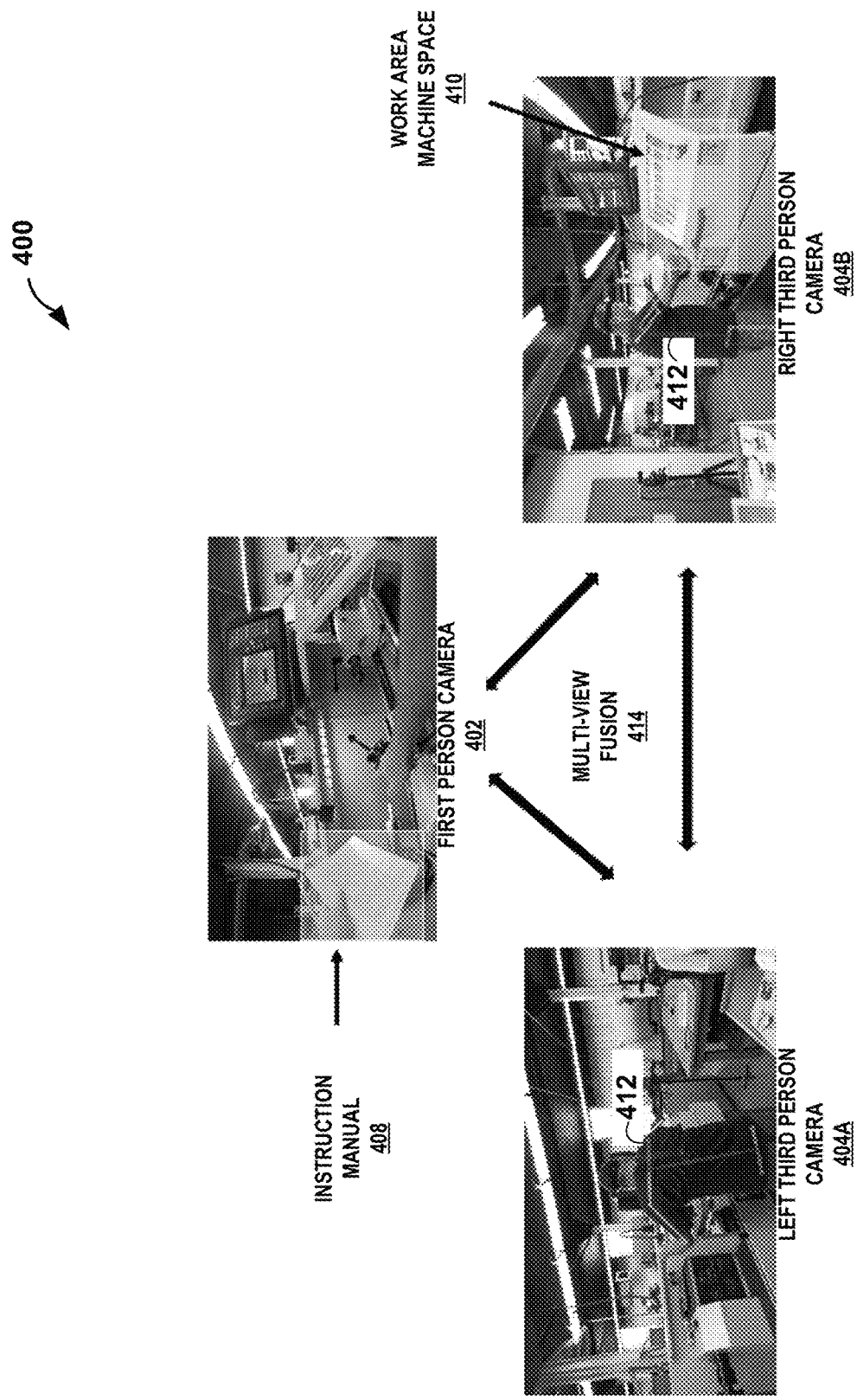
FIG. 4 is a diagram illustrating an example system for generating training information in accordance with the techniques of the disclosure.

FIG. 4 is a diagram illustrating example system 400 for generating training information in accordance with the techniques of the disclosure. In some examples, FIG. 4 depicts the fusion 414 of information from multiple modalities (312) of FIG. 3.

As depicted in FIG. 4, video devices 106 include camera 402, which captures a wide-angle, first-person perspective of first user 102, camera 404A, which captures a third-person perspective of first user 102 from a position to the left of first user 102, and camera 404B, which captures a third-person perspective of first user 102 from a position to the right of first user 102.

Video recognition unit 214 receives video data obtained from cameras 402, 404A, and 404B and performs object recognition to identify one or more objects depicted in the video data. For example, video recognition unit 214 identifies instruction manual 408 imaged by camera 402 and work area machine space 410 imaged by camera 404B. Furthermore, video recognition unit 214 labels video data from cameras 404A and 404B with human pose data 412 for first user 102.

Machine learning system 112 fuses the information from multiple modalities to update domain model 114 of FIG. 1. For example, as illustrated in FIG. 4, machine learning system 112 processes video data obtained from cameras 402, 404A, and 404B with, e.g., audio data 109, sensor data 121, and the textual data obtained from domain documents 104 of FIG. 1 to update domain model 114. For example, machine learning system 112 correlates a portion of video data to a portion of audio data by identifying an object depicted in the video data, identifying, from audio data 109, a reference to the object, and correlating the object depicted in the video data to the reference to the object within audio data 109. Machine learning system 112 may then define domain model 114 based on the correlation of the object identified from the video data to the reference to the object identified from audio data 109 by using the correlation to define, e.g., an ontology, an entity, an action, an event, or a rule of domain model 114 that defines performance of the task.

As an illustrative example, video recognition unit 214 detects, from video data obtained from cameras 402, 404A, and 404B, human pose data (e.g., skeleton detection and/or joint detection) and recognizes objects by performing object detection. Video recognition unit 214 performs action sequence recognition to detect an action based on recognized sequences of human poses. In some examples, video recognition unit 214 groups similar actions that are close in time to one another by ignoring very short intervals of time between similar actions. In some examples, video recognition unit 214 generates a list of recognized actions and a confidence in that video recognition unit 214 correctly identified the action. In some examples, audio recognition unit 212 may normalize a detected object or tool by checking for equivalent names during a population of the knowledge database with, e.g., narrative information from first user 102 or domain documents 104. For example, an instruction manual may refer to a part as a "roller upper," while the SME refers to the same part as an "upper roller," or two different documents may refer to the same tool as a "dial gauge" or "dial indicator." Machine learning system 112 may increase the accuracy of video extraction results obtained by video recognition unit 214 through the exploitation of ontology knowledge of domain model 114 so as to remove incorrect or inconsistent hypotheses. For example, machine learning system may determine whether a recognized action sequence comprising an action, an object, and a tool/instrument is consistent or permitted by domain model 114. An action recognized by video recognition unit 214, for example, as "cleaning with a hammer" is not possible and would be discarded by machine learning system 112. Further, machine learning system 112 may fuse similar actions of longer time intervals from video data 107.

Continuing the foregoing example, machine learning system 112 determines whether one or more references to an object obtained from audio data 109 corresponds to the recognized object in video data 107. For example, if a portion of audio data 109 describes an action, an object, a tool, and a location, and the portion of audio data 109 is in the vicinity of a portion of video data 107, and the semantic information extracted from that portion of video data 107 matches the portion of audio data 109 (e.g., the action, the object, and the tool are recognized in the portion of video data 107), then machine learning system 112 forms a correlation between the portion of audio data 109 and portion of video data 107.

As another example, if a portion of audio data 109 describes an action, an object, a tool, and a location, and the semantic information extracted from a portion of video data 107 does not match the portion of audio data 109 (e.g., the action, the object, and the tool are not recognized in the portion of video data 107), then machine learning system 112 checks the recognized objects in video data 107 in sequence according to confidence in the object recognition. If the objects described in the audio data 109 appear in video data 107 with a level of certainty above a predetermined threshold, then machine learning system 112 forms a correlation between the portion of audio data 109 and portion of video data 107.

As another example, if a portion of audio data 109 describes an action, an object, a tool, and a location, and the semantic information extracted from video data 107 does not match the portion of audio data 109 (e.g., the action, the object, and the tool are not recognized in the portion of video data 107), but the objects that appear in video data 107 are recognized with a high level of certainty, then machine learning system 112 determines that the objects are correctly recognized in video data 107 and machine learning system uses video data 107 in constructing domain model 114.

As another example, if a portion of audio data 109 describes an action, an object, a tool, and a location, and the semantic information extracted from video data 107 does not match the portion of audio data 109 (e.g., the action, the object, and the tool are not recognized in the portion of video data 107), but the objects that appear in video data 107 are recognized with a low level of certainty, then machine learning system 112 determines that the objects may not be correctly recognized in video data 107 and computation engine 130 generates a query to first user 102 (e.g., the SME) to resolve the ambiguity.

As another example, if a portion of audio data 109 describes an action, an object, a tool, and a location, but there is no portion of video data 107 that corresponds to the portion of audio data 109, then machine learning system 112 treats the portion of audio data 109 as including implicit knowledge. Machine learning system 112 may then use this portion of audio data 109 in constructing domain model 114.

Figure 5:
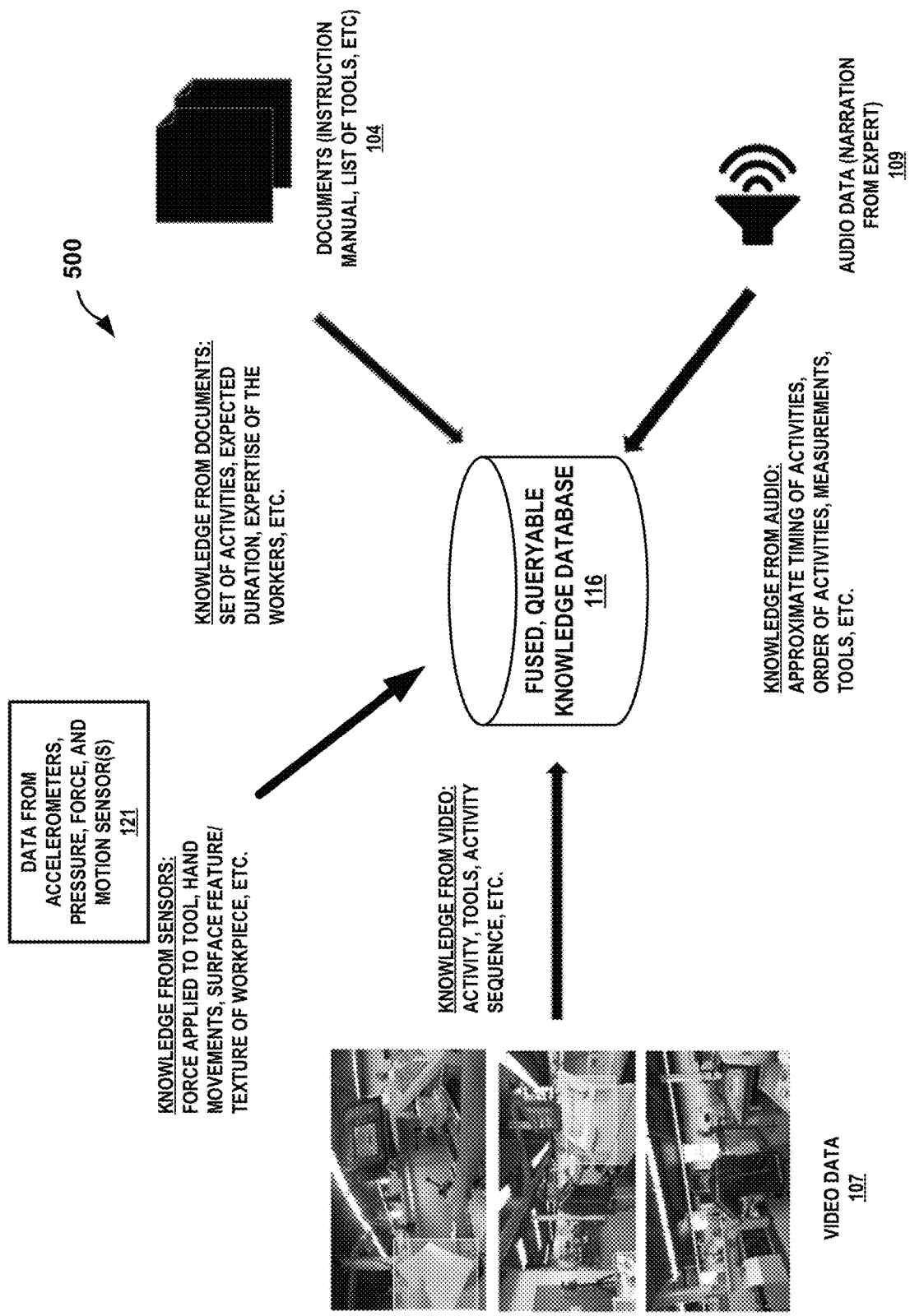
FIG. 5 is a diagram illustrating an example system for generating training information in accordance with the techniques of the disclosure.

FIG. 5 is a diagram illustrating example system 500 for generating training information in accordance with the techniques of the disclosure. In some examples, system 500 illustrates an example of the creation of knowledge database 116 of FIG. 1. For convenience, FIG. 5 is described with respect to FIGS. 1 and 2.

As depicted in the example of FIG. 5, machine learning system 112 fuses information from multiple modalities to update domain model 114, from which training information 117 may be obtained and stored within knowledge database 116. For example, the multiple modalities may include video data 107, from which machine learning system 112 captures knowledge of activities, activity sequences, tools, etc. related to performance of the task. As another example, the multiple modalities may include domain documents 104, including instruction manuals, lists of tools, etc. from which machine learning system 112 captures knowledge of a set of activities, an expected duration, an expertise of the worker, etc., related to the task. As another example, the multiple modalities may include audio data (e.g., provided via narration by an SME such as first user 102) from which machine learning system 112 captures knowledge of approximate chronological or sequential timing of activities, an order of activities, measurements, tools, procedures, etc. As yet another example, the multiple modalities may include sensor data 121 (e.g., provided by one or more accelerometers, pressure sensors, force sensors, and/or motion sensors) from which machine learning system 112 captures knowledge of micromovements by first user 102, such as hand movements, actions of first user 102, physical forces (e.g., rotational or translational) applied to one or more objects such as a tool or workpiece, or surface features of the one or more objects, such as a texture or roughness of a workpiece. Machine learning system 112 processes video data 107, audio data 109, sensor data 121 and the textual data obtained from domain documents 104 to update domain model 114. Training unit 210 applies domain model 114 to generate training information 117 for the task, which training unit 210 stores in the form of knowledge database 116, which may be a fused, knowledge database that is query-able by trainees for training information pertaining to performance of a task or performance of one or more steps of a plurality of steps for accomplishing the task.

Figure 6:
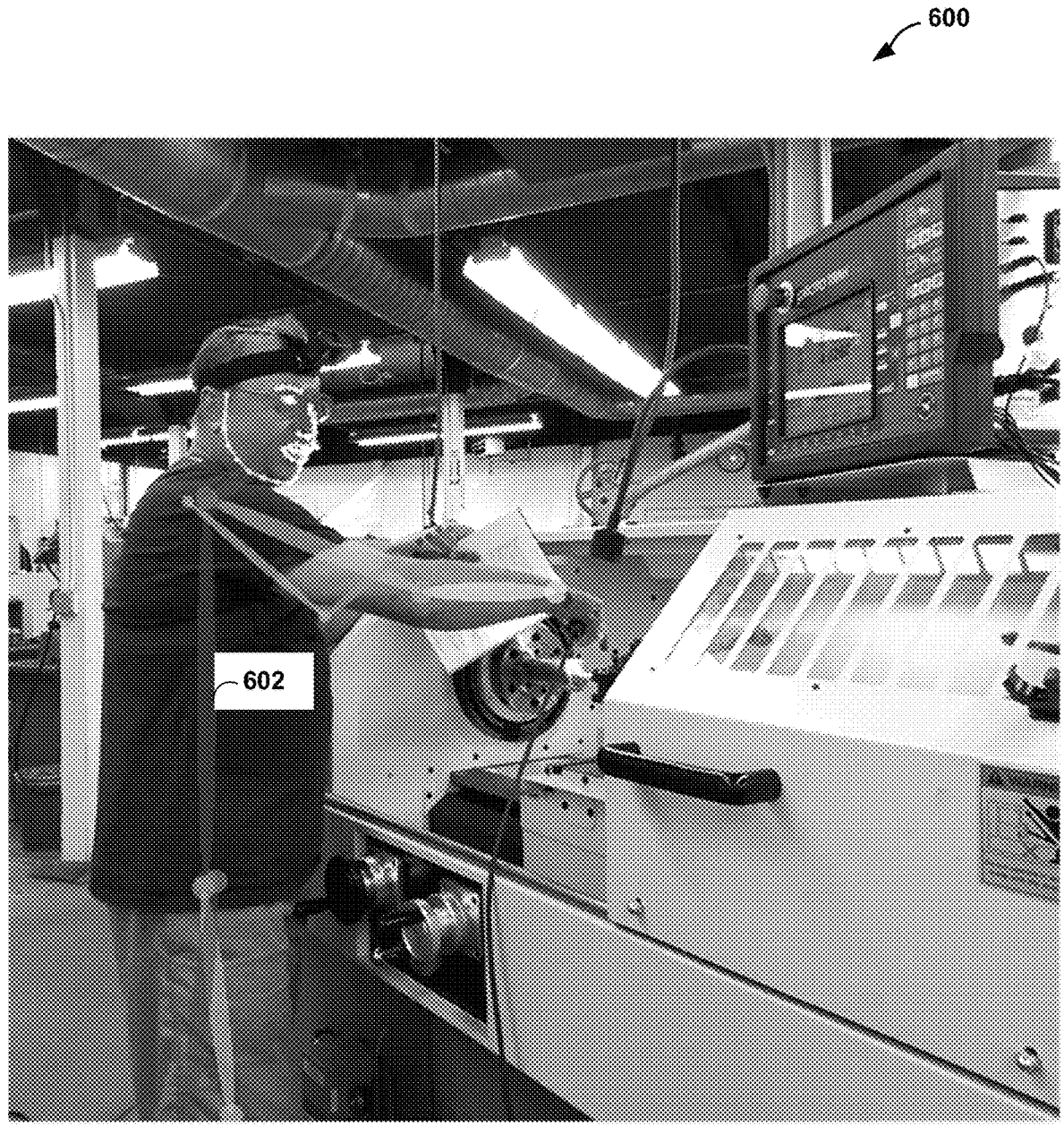
FIG. 6 is an illustration of labeled video data for use in generating training information in accordance with the techniques of the disclosure.

FIG. 6 is an illustration of labeled video data 600 for use in generating training information in accordance with the techniques of the disclosure. In some examples, video recognition unit 214 of FIG. 2 processes video data 107 obtained via one or more video devices 106 to generate labeled video data 600. As depicted in FIG. 6, labeled video data 600 comprises a single video frame labeled with human pose data 602, including, for example, skeletal pose data, joint recognition, hand gesture recognition, etc., of first user 118 of FIG. 1.

Figure 7:
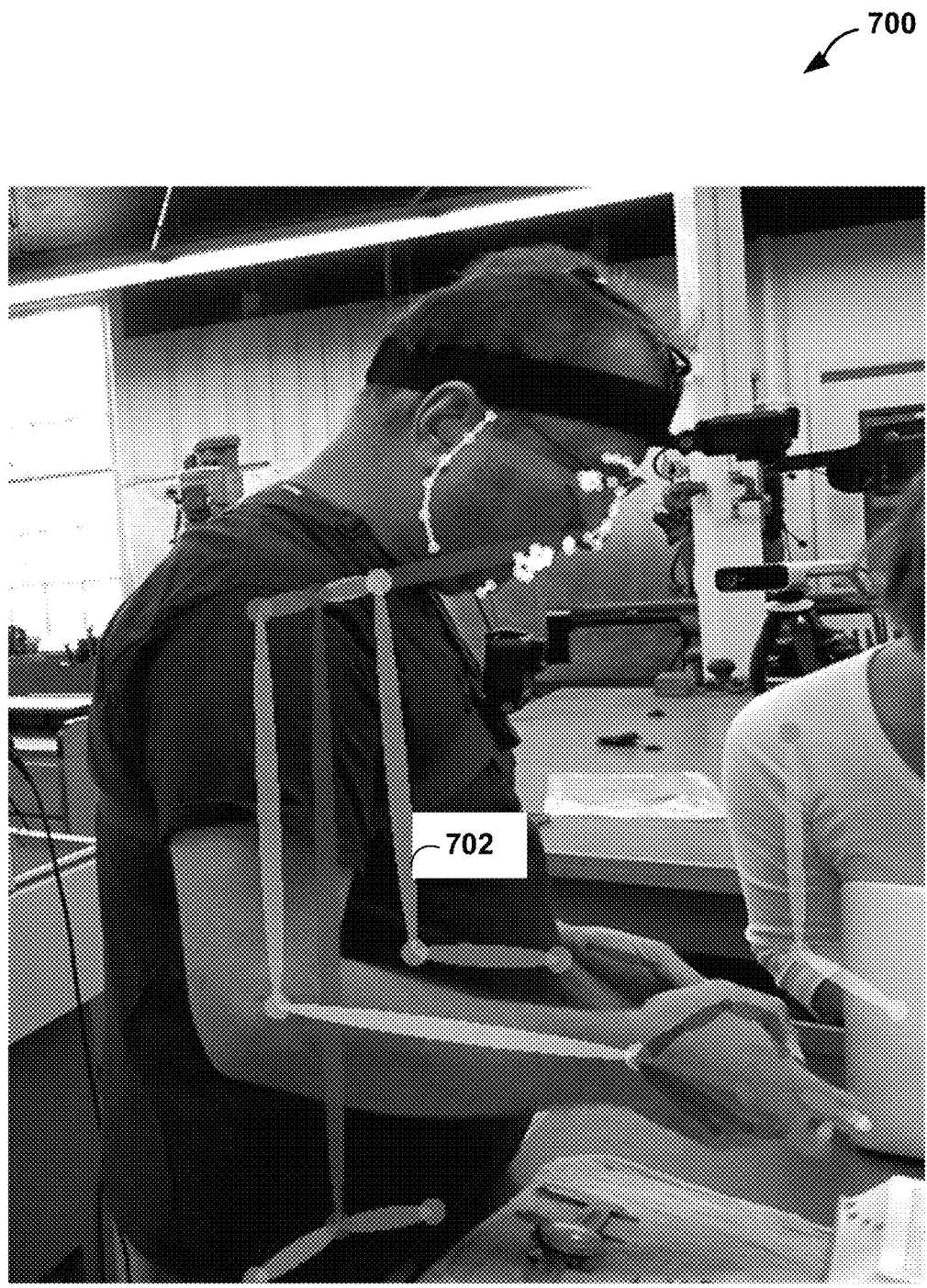
FIG. 7 is an illustration of labeled video data for use in generating training information in accordance with the techniques of the disclosure.

FIG. 7 is an illustration of labeled video data 700 for use in generating training information in accordance with the techniques of the disclosure. In some examples, video recognition unit 214 of FIG. 2 processes video data 107 obtained via one or more video devices 106 to generate labeled video data 700. As depicted in FIG. 7, labeled video data 700 comprises a single video frame labeled with human pose data 702, including, for example, skeletal pose data, joint recognition, hand gesture recognition, etc., of first user 118 of FIG. 1.

Figure 8:
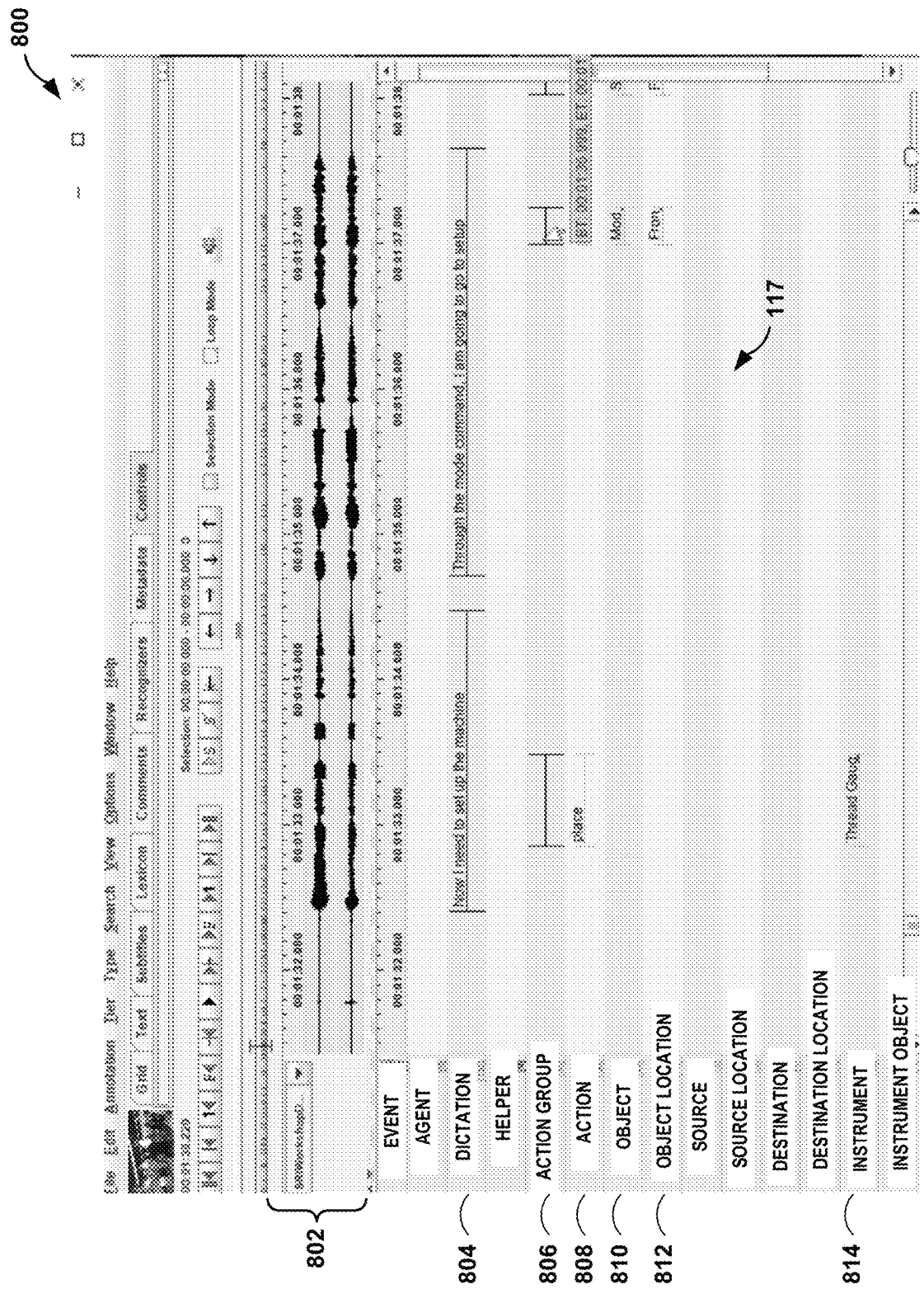
FIG. 8 is an illustration of an example user interface depicting training information generated in accordance with the techniques of the disclosure.

FIG. 8 is an illustration of an example user interface depicting 800 training information 117 generated in accordance with the techniques of the disclosure. Training information 117 is, for example, training information 117 generated by training unit 210 of FIG. 2. As illustrated in the example of FIG. 8, user interface 800 presents training information 117 in the form of data of multiple modalities, such as portions of video data 107, audio data 109, sensor data 121, and domain documents 104, in which each type of data is correlated to one another based on the presence of a same object, concept, or step in performance of a task.

As illustrative examples, user interface 800 includes displays 802, 804, 806, 808, 810, 812, and 814. Display 802 depicts a chronological graph of video data 107. Display 804 depicts a transcription of a portion of audio data 107 (e.g., a narrative by first user 102) that correlates to a respective portion of video data 107. Display 806 identifies a portion of video data 107 as corresponding to a recognized action sequence (e.g., a step of a plurality of steps for performing the task). Display 808 depicts a label for the recognized action sequence for the portion of video data 107 identified by display 806. Display 810 identifies a portion of video data 107 as depicting a recognized object. Display 812 identifies a location of the recognized object within the workspace depicted in video data 107. Display 814 identifies a portion of video data 107 as depicting a recognized tool.

Each of displays 802, 804, 806, 808, 810, 812, and 814 are informed by domain documents 104, video data 107, audio data 109, and/or sensor data 121. In some examples, system 100 of FIG. 1 obtains video data 107, audio data 109, and/or sensor data 121 contemporaneously such that computation engine 130 may correlate portions of video data 107, audio data 109, and/or sensor data 121 to one another based on a correspondence of chronological time. In some examples, system 100 of FIG. 1 obtains video data 107, audio data 109, and/or sensor data 121 asynchronously or at different times, such that computation engine 130 may correlate portions of video data 107, audio data 109, and/or sensor data 121 to one another based on recognition of, e.g., objects recognized in video data 107, references to such objects recognized in audio data 109, and/or measurements obtained from sensor data 121.

In some examples, user interface 800 may output a representation of differences in a map of a first SME performing the task versus a second SME performing the same task versus a novice user performing the same task. For example, the representation may include one or more highlighted portions that illustrate changes in behavior or differences in actions performed by each user. Further, user interface 800 may allow a user to zoom in to view a particular area of interest that represents differences between the behavior or actions of different users.

Figure 9:
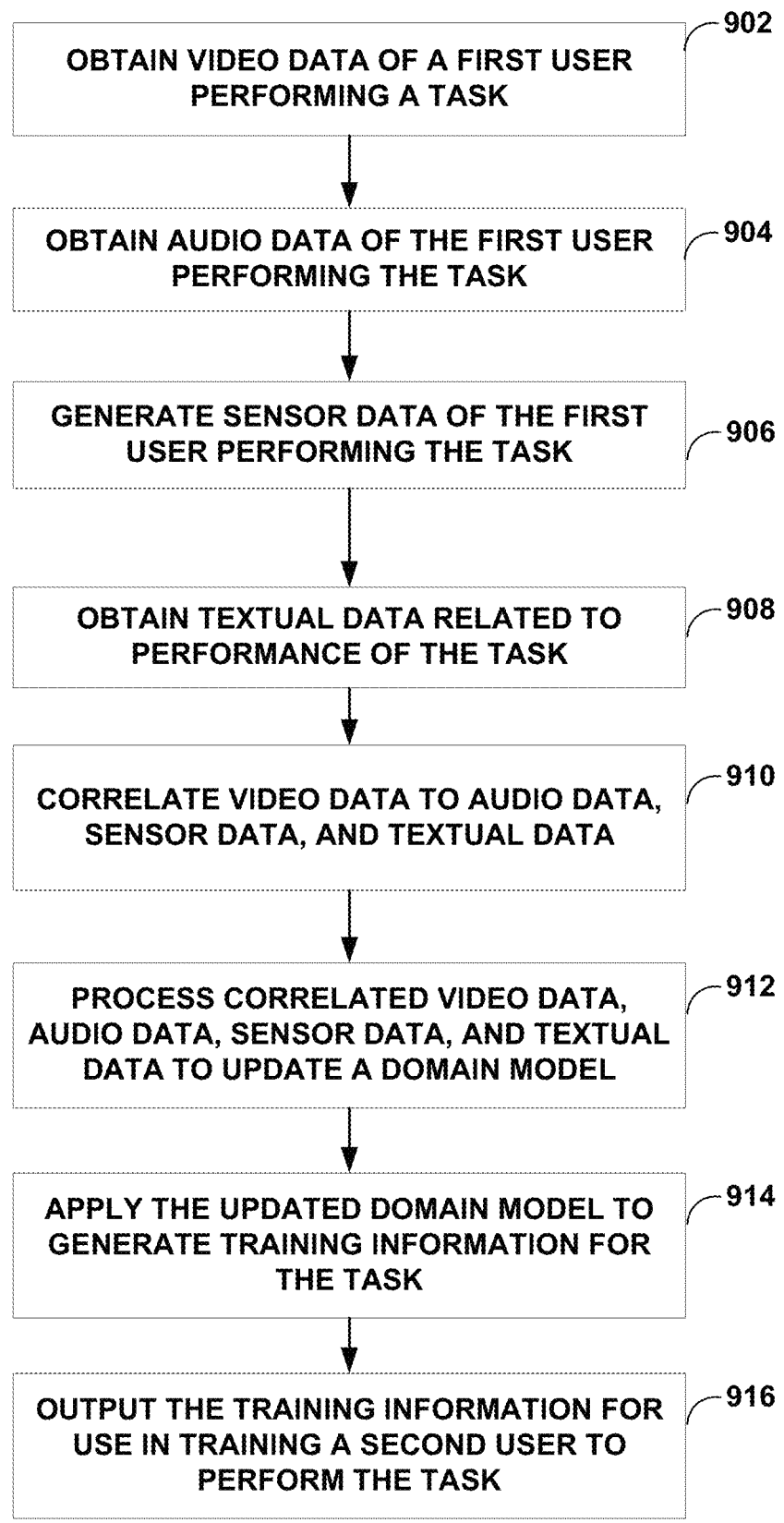
FIG. 9 is a flowchart illustrating an example operation for generating training information in accordance with the techniques of the disclosure.

FIG. 9 is a flowchart illustrating an example operation for generating training information in accordance with the techniques of the disclosure. For convenience, FIG. 9 is described with respect to FIGS. 1 and 2.

As depicted in the example of FIG. 9, video devices 106 obtain video data 107 of first user 102 performing a task (902). Video data 107 may include multiple camera sources. For example, video devices 106 comprise a first video device and a second video device. The first video device is configured to obtain video data of first user 102 performing the task from a first-person perspective viewpoint of first user 102. The second video device is configured to obtain video data of first user 102 performing the task from a third-person perspective viewpoint of first user 102. Video recognition unit 214 receives video data 107 from video devices 106 of FIG. 1 and performs object recognition to identify one or more objects depicted in video data 107. In some examples, video recognition unit 214 identifies first user 102, one or more tools used by first user 102, one or more workpieces with which first user 102 interacts, etc. In some examples, video recognition unit 214 processes video data 107 to generate video data labeled with human pose, object, or activity sequence annotations.

Audio devices 108 obtain audio data 109 of first user 102 performing the task (904). In some examples, audio data 109 comprises a narrative by first user 102 describing the first user's actions while performing the task. In other examples, audio data 109 comprises a narrative by first user 102 describing how to perform the task while the first user is not performing the task, e.g., such as during an interview of first user 102 before or after performing the task. Audio recognition unit 212 receives audio data 109 from audio devices 108 of FIG. 1 and performs speech recognition to identify references to one or more objects or concepts present within audio data 109.

Sensor devices 120 obtain sensor data 121 of first user 102 performing the task (906). Sensors 120 may include, e.g., one or more motion, pressure, force, or acceleration sensors. In some examples, sensors 120 are worn by first user 102 or incorporated into articles worn by first user 102, e.g., motion tracking gloves that detect motion and/or force of a finger, hand, and/or arm of the user. In some examples, sensors 120 are incorporated into one or more tools used by first user 102, e.g., smart tools that incorporate one or more pressure sensors for detecting a motion and force of the tool during use by the user. In some examples, sensors 102 are external sensors that sense data related to first user 102, a workspace of first user 102, or an object with which first user 102 interacts, such as a force pad that detects force applied by a user to a surface, an IMU that detects acceleration of, e.g., a work surface, workpiece, tool, or first user 102.

Text recognition unit 202 receives textual data in the form of domain documents 104 related to performance of the task (908). Examples of domain documents 104 include an instruction manual for performing the task, a parts lists of parts needed to perform the task, a tool lists of tools needed to perform the task, or other written guides. Text recognition unit 202 performs text recognition to obtain textual data suitable for use by machine learning system 112.

Machine learning system 112 correlates video data 107 to audio data 109, sensor data 121, and the textual data obtained from domain documents 104 (910). In some examples, machine learning system 112 correlates at least a portion of video data 107 to at least a portion of audio data 109, at least a portion of sensor data 121, and at least a portion of the textual data obtained from domain documents 104. Based on the correlation of the video data 107 to audio data 109, sensor data 121, and the textual data, machine learning system 112 may identify at least a portion of the video data that depicts a step of a plurality of steps for performing the task, at least a portion of the audio data that describes the same step of the plurality of steps for performing the task, at least a portion of the sensor data that describes the same step of the plurality of steps for performing the task, and at least a portion of the textual data that describes the same step of the plurality of steps for performing the task. For example, machine learning system 112 extracts first semantic information from video data 107, second semantic information from audio data 109, third semantic information from sensor data 121, and fourth semantic information from the textual data obtained from domain documents 104. Machine learning system 112 correlates the first semantic information to the second, third, and fourth semantic information to identify the portions of video data 107 to audio data 109, sensor data 121, and the textual data obtained from domain documents 104 that depict a same step in performing the task.

Machine learning system 112 processes the correlated video data 107, audio data 109, sensor data 121, and the textual data obtained from domain documents 104 to update domain model 114 to more accurately or comprehensively describe performance of the task (912). Domain model 114 provides a model of the task performed by first user 102. In some examples, domain model 114 models the task as a plurality of steps undertaken to achieve a particular goal. In some examples, domain model 114 models the task by defining at least one of an ontology, a cluster, an entity, an action, an event, or a rule (e.g., a semantic rule) related to performance of the task. For example, machine learning system 112 may correlate a portion of video data to a portion of audio data by identifying an object depicted in video data 107, identifying, from audio data 109, a reference to the object, and correlating the object depicted in video data 107 to the reference to the object within audio data 109. Machine learning system 112 may then update domain model 114 based on the correlation of the object identified from video data 107 to the reference to the object identified from audio data 109 by using the correlation to define, e.g., an ontology, an entity, an action, an event, or a rule of domain model 114 that defines performance of the task.

Training unit 210 applies domain model 114 to generate training information 117 for the task (914). Training information 117 comprises, for example, video data, audio data, sensor data, and/or textual data pertaining to, e.g., the task, one or more steps of a plurality of steps that comprise the task, or an object (e.g., a tool or workpiece) related to the task, each type of data cross-referenced to each other type of data.

Training unit 210 outputs training information 117 for use in training second user 118 to perform the task (916). For example, training information 117 may take the form of interactive, multimedia manuals in the form of textual, audio, and/or video information with which second user 118 may interact. As another example, training information 117 may take the form of augmented reality content. For example, training unit 210 may output such augmented reality content to, e.g., an HMD worn by second user 118 to provide an experiential first-person perspective of the performance of the task by the SME. In some examples, the augmented reality content may include relevant portions of audio data 109, such as narration by first user 102 and relevant portions of video data 107, such as a viewpoint of first user 102 as he or she performs the task.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system for capturing knowledge for performing a task, the system comprising:
a domain model defining a plurality of steps for performing the task;
a video input device configured to obtain video data of a first user performing the plurality of steps for performing the task;
an audio input device configured to obtain audio data describing performance of the plurality of steps for performing the task;
one or more sensors configured to generate sensor data during performance of the plurality of steps for performing the task;
a computation engine configured to:
correlate at least two of the video data, the audio data, and the sensor data to identify at least a portion of each of the at least two of the video data, the audio data, and the sensor data that depicts a same step of the plurality of steps; and
process the identified at least a portion of each of the at least two of the video data, the audio data, and the sensor data to update the domain model defining the plurality of steps for performing the task;
a training unit configured to apply the updated domain model to generate training information for performing the plurality of steps for performing the task; and
an output device configured to output the training information for use in training a second user to perform the plurality of steps for performing the task.

2. The system of claim 1, wherein, to correlate the at least two of the video data, the audio data, and the sensor data to identify the at least a portion of each of the at least two of the video data, the audio data, and the sensor data that depicts the same step of the plurality of steps, the computation engine comprises a machine learning system configured to:
correlate the at least two of the video data, the audio data, and the sensor data to identify the at least a portion of each of the at least two of the video data, the audio data, and the sensor data that depicts the same step of the plurality of steps.

3. The system of claim 2, wherein to correlate the at least two of video data, the audio data, and the sensor data, the machine learning system is configured to:
extract, from the video data, first semantic information related to the plurality of steps for performing the task;
extract, from the audio data, second semantic information related to the plurality of steps for performing the task;
extract, from the sensor data, third semantic information related to the plurality of steps for performing the task; and
identify, from the first semantic information, the second semantic information, and the third semantic information, the at least a portion of the video data that depicts the step of the plurality of steps for performing the task, the at least a portion of the audio data that describes the same step of the plurality of steps for performing the task, and the at least a portion of the sensor data that depicts the same step of the plurality of steps for performing the task.

4. The system of claim 2,
wherein the machine learning system configured to correlate the at least two of video data, the audio data, and the sensor data comprises a first machine learning system configured to correlate the at least two of video data, the audio data, and the sensor,
wherein, to process the identified at least a portion of each of the at least two of the video data, the audio data, and the sensor data to update the domain model defining the plurality of steps for performing the task, the computation engine comprises a second machine learning system configured to process the identified at least a portion of each of the at least two of the video data, the audio data, and the sensor data to update the domain model defining the plurality of steps for performing the task,
wherein to correlate the at least two of the video data, the audio data, and the sensor data to identify the at least a portion of each of the at least two of the video data, the audio data, and the sensor data, the first machine learning system is configured to:
identify, from the at least a portion of the video data, one or more objects used in performing the task;
identify, from the at least a portion of the audio data, a reference to the one or more objects used in performing the task;
identify, from the at least a portion of the sensor data, one or more physical measurements of the one or more objects used in performing the task; and
correlate the one or more objects identified from the at least a portion of the video data to the reference to the one or more objects identified from the at least a portion of the audio data and the one or more physical measurements of the one or more objects identified from the at least a portion of the sensor data; and
wherein to process the identified at least a portion of each of the at least two of the video data, the audio data, and the sensor data to update the domain model defining the plurality of steps for performing the task, the second machine learning system is further configured to define, based on the correlation of the one or more objects identified from the at least a portion of the video data to the reference to the one or more objects identified from the at least a portion of the audio data and the one or more physical measurements of the one or more objects identified from the at least a portion of the sensor data, at least one of an ontology, an entity, an action, an event, or a rule defining the plurality of steps for performing the task of the domain model.

5. The system of claim 1,
wherein the video data of the first user performing the task comprises first video data of the first user performing the task,
wherein the audio data describing the plurality of steps for performing the task comprises first audio data of the first user narrating the plurality of steps for performing the task,
wherein the sensor data generated during performance of the task comprises first sensor data generated during performance of the plurality of steps for performing the task by the first user,
wherein the video input device is further configured to receive second video data of at least one of the second user or a third user performing the plurality of steps for performing the task,
wherein the audio input device is further configured to receive second audio data of the at least one of the second user or the third user narrating the plurality of steps for performing the task,
wherein the one or more sensors are further configured to generate second sensor data during the plurality of steps for performing the task by the at least one of the second user or the third user,
wherein the computation engine is further configured to:
  correlate at least two of the first video data, the first audio data, and the first sensor data to identify at least a portion of each of the at least two of the first video data, the first audio data, and the first sensor data that depicts the same step of the plurality of steps;
  correlate at least two of the second video data, the second audio data, and the second sensor data to identify at least a portion of each of the at least two of the second video data, the second audio data, and the second sensor data that depicts the same step of the plurality of steps; and
  process the correlated at least two of the first video data, the first audio data, and the first sensor data and the correlated at least two of the second video data, the second audio data, and the second sensor data to identify semantic differences between performance of the plurality of steps for performing the task by the first user and performance of the plurality of steps for performing the task by the at least one of the second user or the third user.

6. The system of claim 5,
wherein the at least one of the second user and the third user comprises the third user,
wherein the output device is configured to query at least one of the first user and the at least one of the second user or the third user for an explanation of the identified semantic differences between the performance of the plurality of steps for performing the task by the first user and the performance of the plurality of steps for performing the task by the at least one of the second user or the third user, and
wherein the computation engine is further configured to update, based on the explanation of the identified semantic differences between the performance of the plurality of steps for performing the task by the first user and the performance of the plurality of steps for performing the task by the at least one of the second user or the third user, the domain model defining the plurality of steps for performing of the task.

7. The system of claim 5,
wherein the at least one of the second user and the third user comprises the second user,
wherein, to generate the training information for performing the task, the training unit is configured to generate feedback to the second user describing the identified semantic differences between the performance of the plurality of steps for performing the task by the first user and the performance of the plurality of steps for performing the task by the second user, and
wherein to output the training information for use in training the second user to perform the task, the output device is configured to output the feedback to the second user describing the identified semantic differences between the performance of the plurality of steps for performing the task by the first user and the performance of the plurality of steps for performing the task by the second user.

8. The system of claim 1, wherein the video data comprises video data annotated with at least one of human pose data of the first user or object detection data.

9. The system of claim 1,
wherein the system further comprises a document processing unit configured to receive textual data describing performance of the plurality of steps for performing the task;
wherein, to correlate the at least two of the video data, the audio data, and the sensor data to identify the at least a portion of each of the at least two of the video data, the audio data, and the sensor data, the computation engine is configured to correlate the video data, the audio data, the sensor data, and the textual data to identify the at least a portion of the video data, the at least a portion of the audio data, the at least a portion of the sensor data, and at least a portion of the textual data that each depicts a same step of the plurality of steps, and
wherein to process the identified at least a portion of each of the at least two of the video data, the audio data, and the sensor data to update the domain model defining the plurality of steps for performing the task, the computation engine is configured to process the identified at least a portion of the video data, the at least a portion of the audio data, the at least a portion of the sensor data, and the at least a portion of the textual data to update the domain model defining the plurality of steps for performing the task.

10. The system of claim 9, wherein the textual data describing performance of the plurality of steps for performing the task comprises one or more of an instruction manual for performing a task or a list of tools used during performance of the plurality of steps for performing the task.

11. The system of claim 1, wherein the one or more sensors are configured to generate the sensor data based on inputs from one or more of the first user, a workspace of the first user, one or more tools used by the first user during performance of the plurality of steps for performing the task, or one or more objects used in performance of the plurality of steps for performing the task.

12. The system of claim 1,
wherein the at least two of the video data, the audio data, and the sensor data comprises the sensor data, and
wherein the sensor data comprises sensor data of one or more of:
  data related to at least one of micromovements or actions of the first user;

data related to one or more objects with which the first user interacts during performance of the plurality of steps for performing the task;
data related to one or more finger or hand movements of the first user, a wrist rotation of the first user, or a hand pressure or a finger pressure of the first user applied to one or more objects; or
data related to one or more of an angle between one or more tools and the one or more objects, a pressure exerted on the one or more objects, a surface feature of the one or more objects, or an acceleration of the one or more objects.

13. The system of claim 1,
wherein the at least two of the video data, the audio data, and the sensor data comprises the video data, and
wherein the video input device comprises:
a first video input device configured to obtain, from a first-person perspective viewpoint of the first user, first video data of the first user performing the plurality of steps for performing the task; and
a second video input device configured to obtain, from a third-person perspective viewpoint of the first user, second video data of the first user performing the plurality of steps for performing the task,
wherein the video data of the first user performing the task comprises the first video data and the second video data.

14. The system of claim 1, wherein to generate training information for performing the plurality of steps for performing the task, the training unit is configured to generate at least one of:
augmented reality content for training the second user to perform the plurality of steps for performing the task; or
an interactive technical manual for training the second user to perform the plurality of steps for performing the task.

15. The system of claim 1,
wherein the training unit is further configured to receive, from the second user, a query for instructions for performing the plurality of steps for performing the task, and
wherein the training unit is further configured to apply the updated domain model to generate the training information for performing the plurality of steps for performing the task in response to receiving the query.

16. The system of claim 1,
wherein the computation engine is configured to process the identified at least a portion of each of the at least two of the video data, the audio data, and the sensor data to identify semantic differences between the at least a portion of each of the at least two of the video data, the audio data, and the sensor data,
wherein the output device is configured to query the first user for an explanation of the identified semantic differences between the at least a portion of each of the at least two of the video data, the audio data, and the sensor data, and
wherein the computation engine is configured to update, based on the explanation of the identified semantic differences between the at least a portion of each of the at least two of the video data, the audio data, and the sensor data, the domain model defining the plurality of steps for performing the task.

17. The system of claim 1,
wherein the at least two of the video data, the audio data, and the sensor data comprises the audio data, and wherein the audio data describing performance of the plurality of steps for performing the task comprises audio data of an interview with the first user and specifies:
a model of decision-making during performance of the plurality of steps for performing the task; and
one or more procedural skills in at least one of a mechanical, technical, or artisanal domain.

18. A method for capturing knowledge for performing a task, the method comprising:
obtaining, by a video input device, video data of a first user performing a plurality of steps for performing the task;
obtaining, by an audio input device, audio data describing performance of the plurality of steps for performing the task;
generating, by one or more sensors, sensor data during performance of the plurality of steps for performing the task;
correlating, by a computation engine, at least two of the video data, the audio data, and the sensor data to identify at least a portion of each of the at least two of the video data, the audio data, and the sensor data that depicts a same step of the plurality of steps;
processing, by the computation engine, the identified at least a portion of each of the at least two of the video data, the audio data, and the sensor data to update a domain model defining the plurality of steps for performing the task;
applying, by a training unit, the updated domain model to generate training information for performing the plurality of steps for performing the task; and
outputting, by an output device, the training information for use in training a second user to perform the plurality of steps for performing the task.

19. A non-transitory, computer-readable medium comprising instructions that, when executed, are configured to cause processing circuitry to:
obtain video data of a first user performing a plurality of steps for performing a task;
obtain audio data describing performance of the plurality of steps for performing the task;
generate sensor data during performance of the plurality of steps for performing the task;
correlate at least two of the video data, the audio data, and the sensor data to identify at least a portion of each of the at least two of the video data, the audio data, and the sensor data that depicts a same step of the plurality of steps;
process the identified at least a portion of each of the at least two of the video data, the audio data, and the sensor data to update the domain model defining the plurality of steps for performing the task;
apply the updated domain model to generate training information for performing the plurality of steps for performing the task; and
output the training information for use in training a second user to perform the plurality of steps for performing the task.

20. The system of claim 1, wherein the domain model defining the plurality of steps for performing the task comprises at least one of an ontology, a cluster of related concepts or objects, an entity, an action, an event, or a rule related to the plurality of steps for performing the task.

* * * * *